US012675647B2

(12) United States Patent
Zhou et al.

(10) Patent No.: US 12,675,647 B2
(45) Date of Patent: Jul. 7, 2026

(54) IMAGE INPAINTING USING A CONTENT PRESERVATION VALUE

(71) Applicant: ADOBE INC., San Jose, CA (US)

(72) Inventors: Yuqian Zhou, Bellevue, WA (US); Krishna Kumar Singh, San Jose, CA (US); Benjamin Delarre, San Francisco, CA (US); Zhe Lin, Clyde Hill, WA (US); Jingwan Lu, Sunnyvale, CA (US); Taesung Park, San Francisco, CA (US); Sohrab Amirghodsi, Seattle, WA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 211 days.

(21) Appl. No.: 18/454,850

(22) Filed: Aug. 24, 2023

(65) Prior Publication Data

US 2025/0069203 A1    Feb. 27, 2025

(51) Int. Cl.
| | |
|---|---|
| *G06T 5/77* | (2024.01) |
| *G06F 40/40* | (2020.01) |
| *G06T 11/00* | (2026.01) |

(52) U.S. Cl.
CPC ................ *G06T 5/77* (2024.01); *G06F 40/40* (2020.01); *G06T 11/00* (2013.01); *G06T 2200/24* (2013.01); *G06T 2207/20084* (2013.01); *G06T 2207/20104* (2013.01); *G06T 2210/62* (2013.01)

(58) Field of Classification Search
CPC ....... G06T 5/77; G06T 11/00; G06T 2200/24; G06T 2207/20084; G06T 2207/20104; G06T 2210/62; G06T 5/60; G06T 11/60; G06F 40/40
See application file for complete search history.

(56) References Cited

U.S. PATENT DOCUMENTS

| | | | |
|---|---|---|---|
| 7,171,057 | B1 | 1/2007 | Wilensky et al. |
| 11,734,570 | B1 | 8/2023 | Kurz et al. |
| 2006/0013501 | A1 | 1/2006 | Tamura |
| 2013/0182184 | A1* | 7/2013 | Senlet .................... H04N 5/272 |
| | | | 348/586 |
| 2017/0103502 | A1* | 4/2017 | Gilra ......................... G06T 5/77 |

(Continued)

OTHER PUBLICATIONS

Meng, et al., "SDEdit: Guided Image Synthesis and Editing with Stochastic Differential Equations", arXiv preprint arXiv:2108.01073v2 [cs.CV] Jan. 5, 2022, 33 pages.

(Continued)

*Primary Examiner* — Michael Le
(74) *Attorney, Agent, or Firm* — F. CHAU & ASSOCIATES, LLC

(57) ABSTRACT

A method, non-transitory computer readable medium, apparatus, and system for image generation are described. An embodiment of the present disclosure includes obtaining an input image, an inpainting mask, and a plurality of content preservation values corresponding to different regions of the inpainting mask, and identifying a plurality of mask bands of the inpainting mask based on the plurality of content preservation values. An image generation model generates an output image based on the input image and the inpainting mask. The output image is generated in a plurality of phases. Each of the plurality of phases uses a corresponding mask band of the plurality of mask bands as an input.

20 Claims, 14 Drawing Sheets

(56)        References Cited

U.S. PATENT DOCUMENTS

| | | | |
|---|---|---|---|
| 2019/0164003 A1 | 5/2019 | Abhishek et al. | |
| 2020/0342576 A1* | 10/2020 | Lin | G06V 10/82 |
| 2021/0150678 A1* | 5/2021 | Yi | G06T 3/4046 |
| 2021/0150681 A1* | 5/2021 | Sytnik | G06T 5/50 |
| 2022/0156893 A1* | 5/2022 | Zhou | G06T 3/18 |
| 2022/0309623 A1* | 9/2022 | Wu | G06V 20/46 |
| 2022/0366544 A1* | 11/2022 | Kudelski | G06T 5/77 |
| 2023/0103638 A1* | 4/2023 | Saharia | G06N 3/08 |
| | | | 382/155 |
| 2023/0281955 A1 | 9/2023 | Ackerson et al. | |
| 2024/0249422 A1* | 7/2024 | Jampani | G06T 5/77 |
| 2024/0295953 A1 | 9/2024 | Zakharov et al. | |
| 2024/0331235 A1* | 10/2024 | Smock | G06T 11/60 |
| 2024/0428481 A1* | 12/2024 | Rami Koujan | G06F 40/279 |
| 2025/0029297 A1* | 1/2025 | Stenger | G06T 11/60 |

OTHER PUBLICATIONS

Goodfellow, et al., "Generative Adversarial Nets", Proceedings of the International Conference on Neural Information Processing Systems (NIPS 2014), 2014, pp. 2672-2680, 9 pages.

Office Action dated Jun. 18, 2024 in related U.S. Appl. No. 18/511,230.

Office Action dated Nov. 6, 2025 in related U.S. Appl. No. 18/511,230.

* cited by examiner

Figure 2:
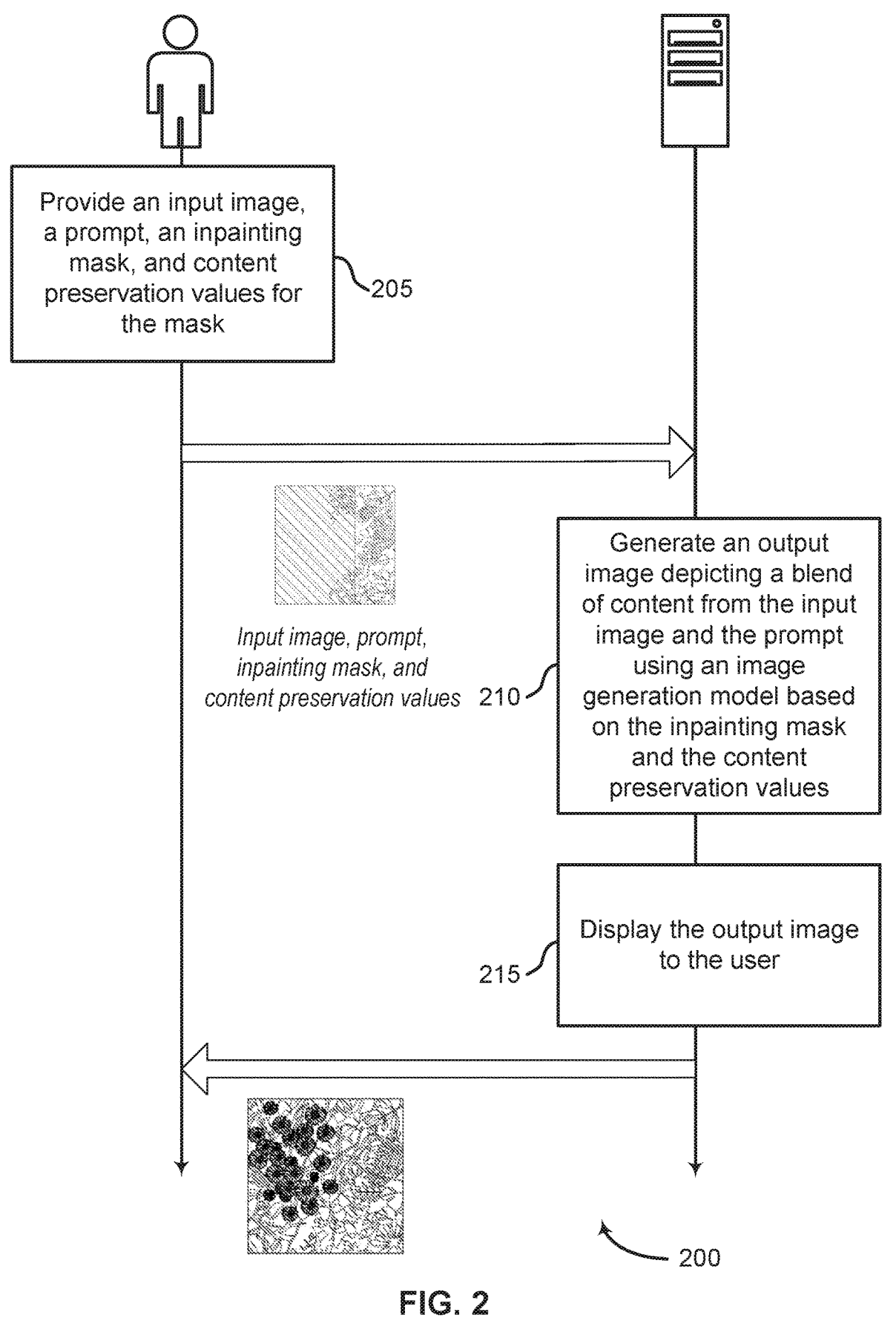

Provide an input image, a prompt, an inpainting mask, and content preservation values for the mask ~205

*Input image, prompt, inpainting mask, and content preservation values* 210

Generate an output image depicting a blend of content from the input image and the prompt using an image generation model based on the inpainting mask and the content preservation values 215 Display the output image to the user

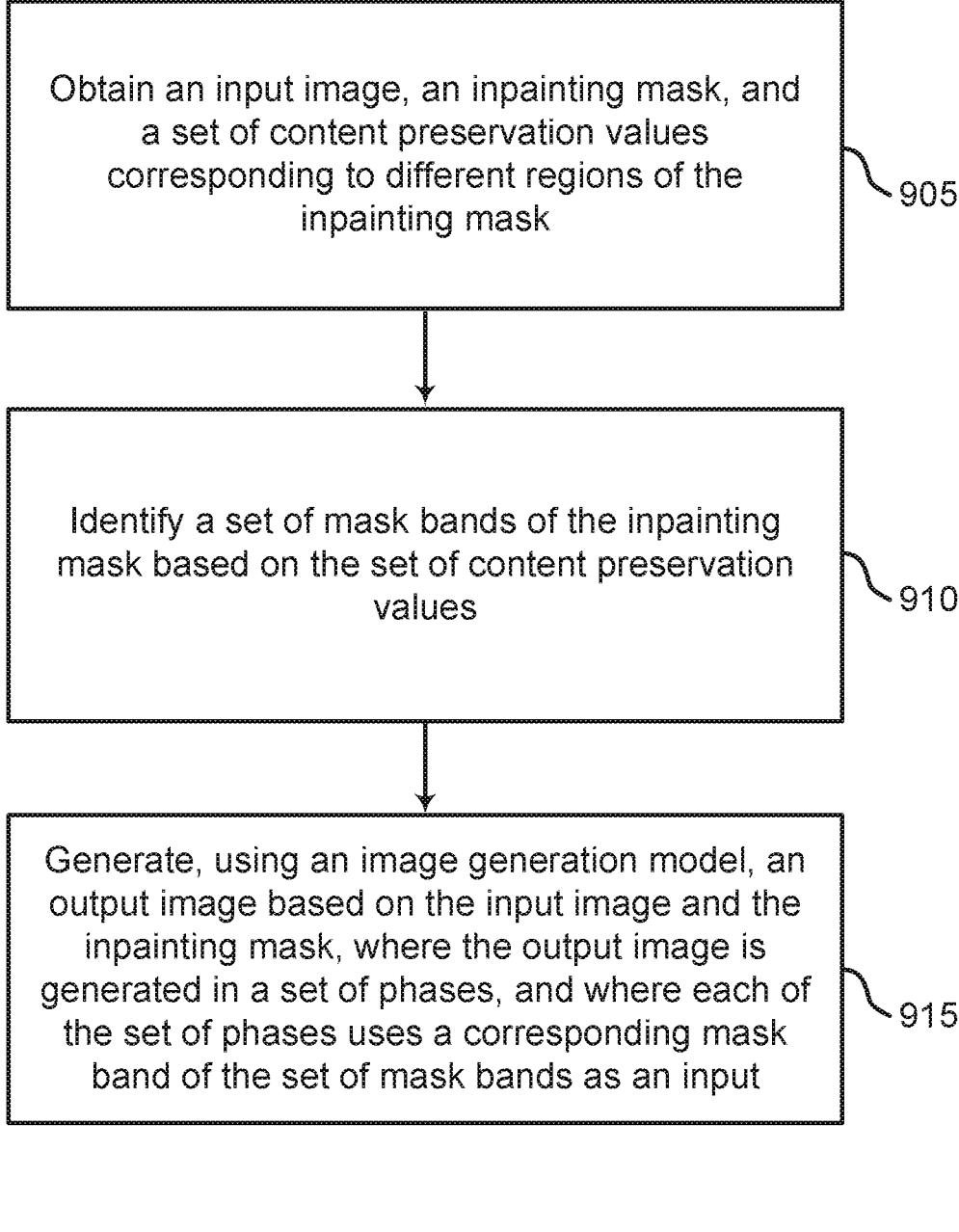

Obtain an input image, an inpainting mask, and a set of content preservation values corresponding to different regions of the inpainting mask

905

Identify a set of mask bands of the inpainting mask based on the set of content preservation values

910

Generate, using an image generation model, an output image based on the input image and the inpainting mask, where the output image is generated in a set of phases, and where each of the set of phases uses a corresponding mask band of the set of mask bands as an input

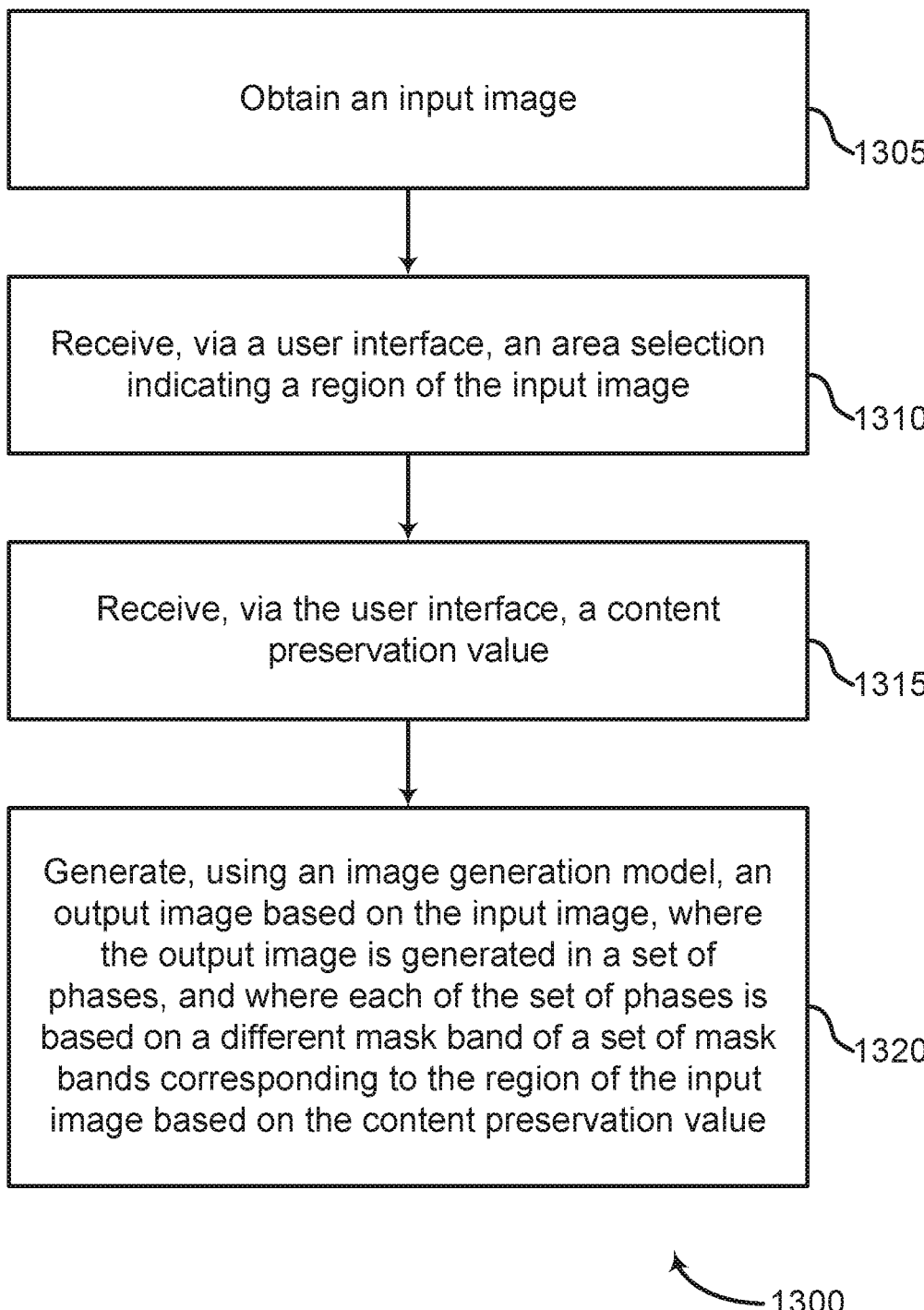

Obtain an input image
1305

Receive, via a user interface, an area selection indicating a region of the input image
1310

Receive, via the user interface, a content preservation value
1315

Generate, using an image generation model, an output image based on the input image, where the output image is generated in a set of phases, and where each of the set of phases is based on a different mask band of a set of mask bands corresponding to the region of the input image based on the content preservation value
1320

Figure 14:
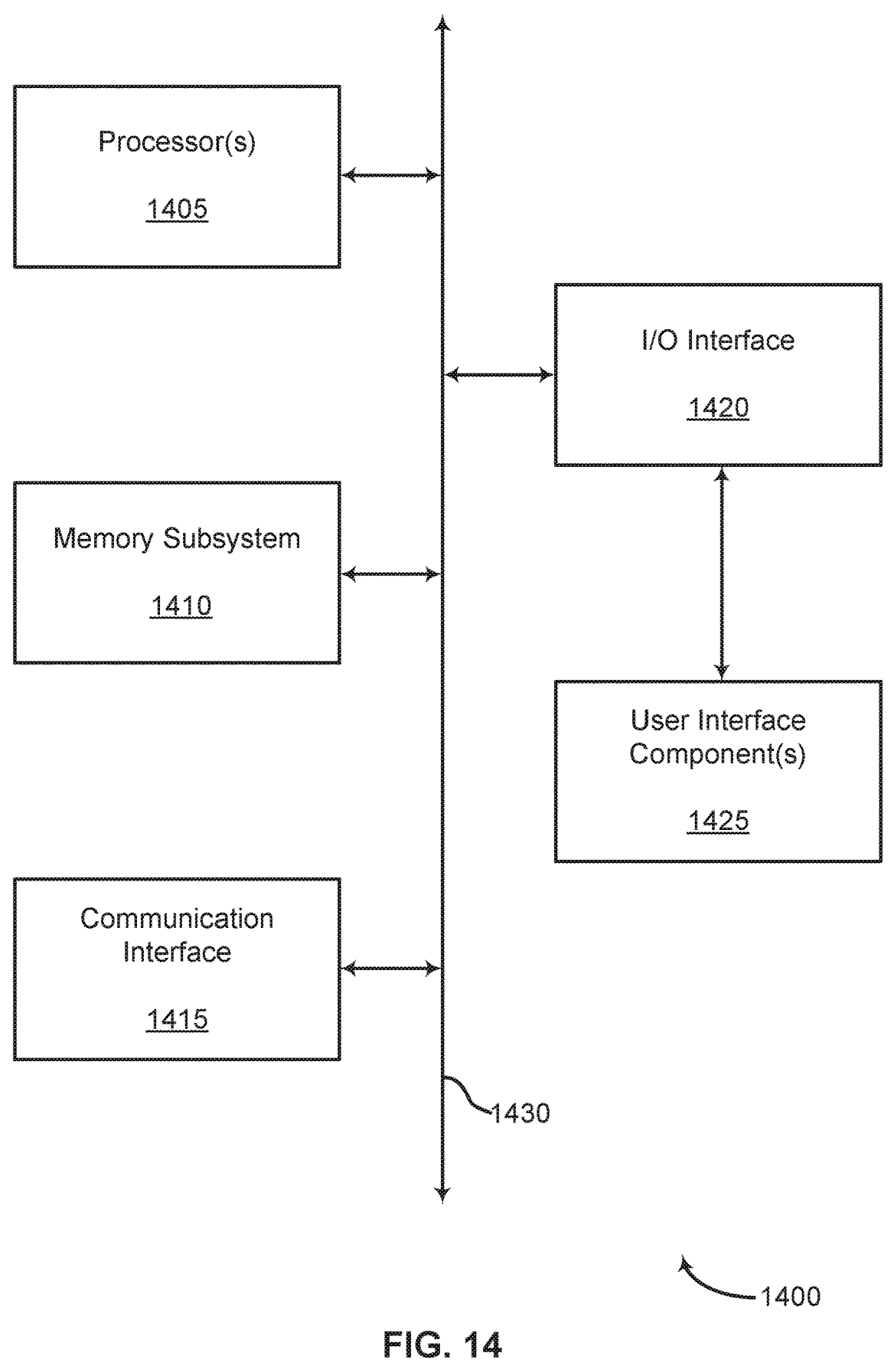

Processor(s)

1405

I/O Interface

1420

Memory Subsystem

1410

User Interface
Component(s)

1425

Communication
Interface

IMAGE INPAINTING USING A CONTENT PRESERVATION VALUE

BACKGROUND

The following relates generally to image generation, and more specifically to image generation using machine learning. Machine learning is an information processing field in which algorithms or models such as artificial neural networks are trained to make predictive outputs in response to input data without being specifically programmed to do so. For example, a machine learning model can be used to generate an image based on input data, where the image is a prediction of what the machine learning model thinks the input data describes.

Image inpainting is an image generation technique of reconstructing a missing region of an image. A machine learning model can be applied to an image including a missing region to predict the content of the missing region.

SUMMARY

Aspects of the present disclosure provide systems and methods for image generation. According to an aspect of the present disclosure, an image generation system identifies a set of mask bands of an inpainting mask for an input image based on a set of content preservation values. In some cases, the image generation system generates, using an image generation process performed by an image generation machine learning model, an output image by using each mask band as an input at a corresponding stage of the image generation process.

In some cases, by using the set of mask bands as iterative input in the image generation process, the image generation system is able to selectively retain different amounts of information from the input image in different areas of an output image respectively corresponding to the set of mask bands. Accordingly, in some cases, the image generation system is able to realistically blend content from the input image with additional content in the output image, thereby providing a more realistic inpainted image than conventional image generation systems can provide.

A method, apparatus, non-transitory computer readable medium, and system for image generation using machine learning are described. One or more aspects of the method, apparatus, non-transitory computer readable medium, and system include obtaining an input image, an inpainting mask, and a plurality of content preservation values corresponding to different regions of the inpainting mask; identifying a plurality of mask bands of the inpainting mask based on the plurality of content preservation values; and generating, using an image generation model, an output image based on the input image and the inpainting mask, wherein the output image is generated in a plurality of phases, and wherein each of the plurality of phases uses a corresponding mask band of the plurality of mask bands as an input.

A method, apparatus, non-transitory computer readable medium, and system for image generation using machine learning are described. One or more aspects of the method, apparatus, non-transitory computer readable medium, and system include obtaining an input image; receiving, via a user interface, an area selection indicating a region of the input image; receiving, via the user interface, a content preservation value; and generating, using an image generation model, an output image based on the input image, wherein the output image is generated in a plurality of phases, and wherein each of the plurality of phases is based on a different mask band of a plurality of mask bands corresponding to the region of the input image based at least in part on the content preservation value.

An apparatus and system for image generation using machine learning are described. One or more aspects of the apparatus and system include one or more processors; one or more memory components coupled with the one or more processors; a mask component configured to identify a plurality of mask bands of an inpainting mask based on a plurality of content preservation values; and an image generation model comprising parameters stored in the one or more memory components and trained to generate an output image based on the plurality of mask bands.

BRIEF DESCRIPTION OF THE DRAWINGS

FIG. 2 shows an example of a method for image generation according to aspects of the present disclosure.

FIG. 9 shows an example of a method for image generation according to aspects of the present disclosure.

FIG. 13 shows an example of a method for image generation using a user interface according to aspects of the present disclosure.

FIG. 14 shows an example of a computing device according to aspects of the present disclosure.

DETAILED DESCRIPTION

Figure 1:
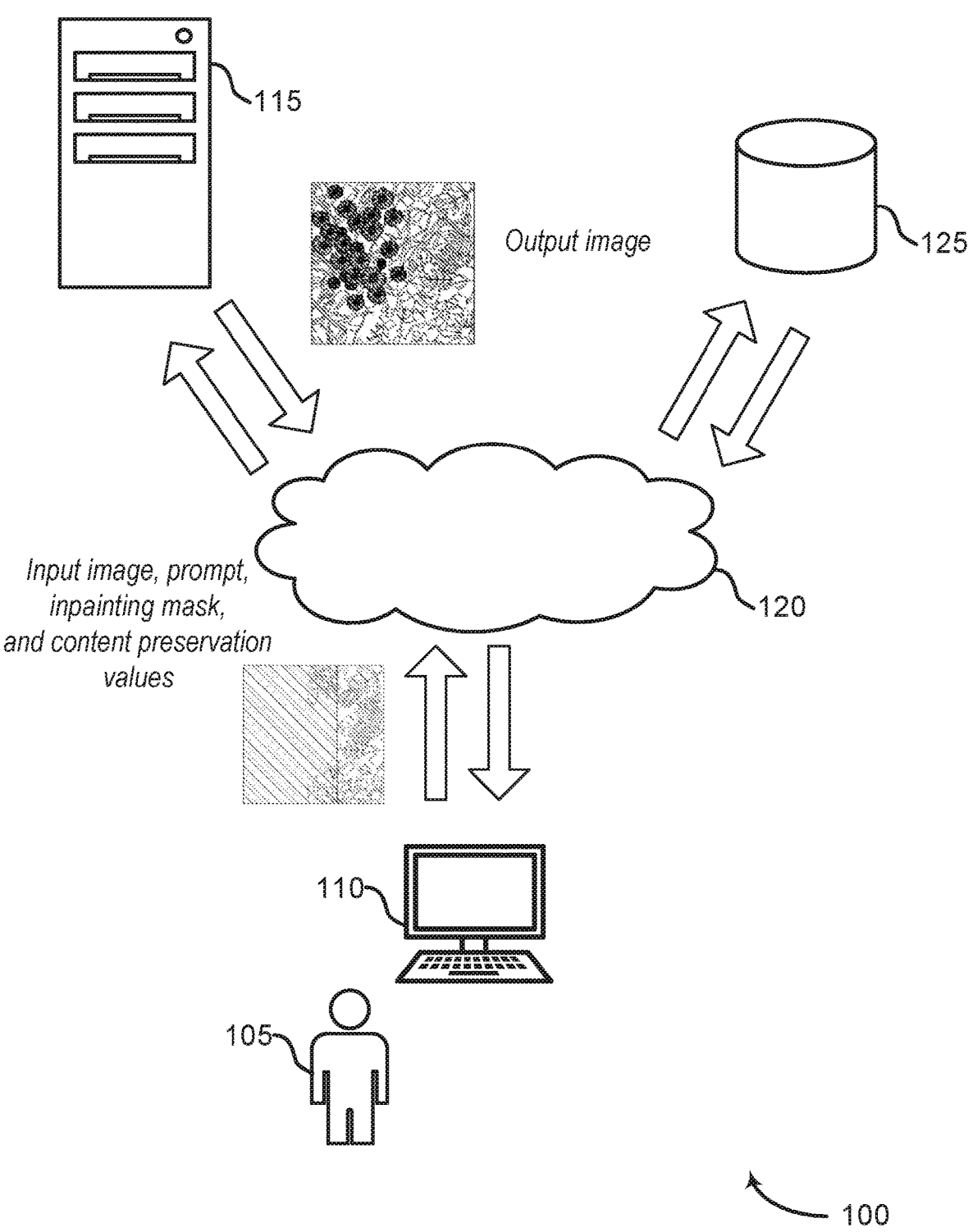
FIG. 1 shows an example of an image generation system according to aspects of the present disclosure.

Image inpainting is an image generation technique of reconstructing a missing region of an image. A machine learning model can be applied to an image including a missing region to predict the content of the missing region.

However, in some cases, conventional image generation systems use a single binary and hard mask during an image generation process, such that all content depicted in a masked region of an input image is replaced by target content. Therefore, conventional image generation systems generate images that do not depict a realistic integration of new target content with original content from an original input image.

Aspects of the present disclosure provide systems and methods for image generation. According to an aspect of the present disclosure, an image generation system identifies a set of mask bands of an inpainting mask for an input image based on a set of content preservation values and generates an output image using an image generation machine learning model by using each mask band as an input at a corresponding stage of an image generation process performed by the image generation model.

In some cases, by using the set of mask bands as iterative input in the image generation process, the image generation system is able to selectively retain different amounts of information from the input image in different areas of an output image respectively corresponding to the set of mask bands. Accordingly, in some cases, the image generation system is able to realistically combine content from the input image with additional content in the output image (for example, via one or more of texture blending, color harmonization, boundary elimination, and the like), thereby providing a more realistic inpainted image than conventional image generation systems can provide.

An example of the image generation system is used in an image inpainting context. In an example, according to some aspects, a user provides an input image and a text prompt describing content to be inserted into the input image to the image generation system. In some cases, the user provides an inpainting mask for the input image (for example, using a selection tool of a user interface of the image generation system). In some cases, the user provides a global transparency value for the inpainting mask and a mask softness value for the mask using one or more brush tools of the user interface, where the mask softness value indicates a number of regions of the mask having greater transparency values than the global transparency value. In some cases, the transparency values of the regions of the inpainting mask respectively correspond to a set of content preservation values provided by the user.

According to some aspects, a mask component of the image generation system obtains a set of mask bands corresponding to the graduated regions of the inpainting mask. In some cases, the image generation system generates an output image based on the input image and the set of mask bands using an image generation model conditioned on the text prompt, where the effect of the prompt on the output image is weighted according to the global transparency value.

According to some aspects, the image generation model generates a noise image by adding noise to each masked region of the input image identified by a mask band of the set of mask bands. In some cases, the image generation model generates an output image using an iterative denoising process initialized using the noise image. In some cases, at each stage of the denoising process, the image generation model outputs an intermediate noise image by removing noise from each masked region of the noise image or the preceding intermediate noise image according to the image generation model's prompt-conditioned prediction of what the output image should look like.

According to some aspects, the denoising process includes a number of stages equal to the number of mask bands. In some cases, at each stage of the denoising process following the first stage, the image generation model replaces predicted noise in successively fewer partially denoised regions of the intermediate noise image with noise from the original noise image, where the order of replacement is determined by the content preservation values corresponding to the masked regions of the intermediate noise images.

In an example, in some cases, the image generation model retains, in a second intermediate noise image, partial noise of a masked region of a first intermediate noise image corresponding to a lowest content preservation value; retains, in a third intermediate noise image, partial noise of masked regions of the second intermediate noise corresponding to both the lowest content preservation value and a second-lowest content preservation value of the inpainting mask; and so on, until the image generation model's predicted noise removal for a masked region corresponding to each content preservation value is only retained in the final intermediate noise image, i.e., the output image.

Accordingly, in some cases, the image generation model uses varying noise levels corresponding to mask transparency values as input during the image generation process such that the image generation model effectively makes more noise-removal predictions for the less-transparent regions of the masked input image than the more-transparent regions, resulting in an output image in which additional content gradually blends into content from the input image according to the content preservation values of the inpainting mask provided by the user. Therefore, in some cases, the image generation system provides an inpainted image that more realistically blends additional content with content from an input image than conventional image generation systems can provide.

Furthermore, according to some aspects, by weighting the effect of the prompt on the output image according to the global transparency value of the inpainting mask, the image generation model provides an intuitive mechanism for controlling a degree to which the input image informs the generated content of the output image.

Still further, in some cases, a display of a semi-transparent mask by a user interface helps a user to indicate how much content from the input image is to be preserved in the output image, and the image generation system therefore provides the user with a more flexible inpainting experience.

Further example applications of the present disclosure in the image inpainting context are provided with reference to FIGS. 1-5. Details regarding the architecture of the image generation system are provided with reference to FIGS. 1, 6-8, and 14. Examples of a process for image generation are provided with reference to FIGS. 2 and 9-12. Examples of a process for image generation using a user interface are provided with reference to FIG. 13.

According to some aspects, by using a set of mask bands as iterative input in an image generation process, an image generation system is able to selectively retain different amounts of information from an input image in different areas of an output image respectively corresponding to the set of mask bands. Accordingly, in some cases, the image generation system is able to realistically blend content from the input image with additional content in the output image, thereby providing a more realistic inpainted image than conventional image generation systems can provide.

Image Generation System

A system and an apparatus for image generation using machine learning are described with reference to FIGS. 1-8 and 14. One or more aspects of the apparatus include one or more processors; one or more memory components coupled with the one or more processors; a mask component configured to identify a plurality of mask bands of an inpainting mask based on a plurality of content preservation values; and an image generation model comprising parameters stored in the one or more memory components and trained to generate an output image based on the plurality of mask bands. In some aspects, the output image depicts, in an area corresponding to the inpainting mask, a blend of content from the input image and content described by the prompt.

Some examples of the system and the apparatus further include a user interface configured to obtain the inpainting mask based on an inpainting region indicated by a user. Some examples of the system and the apparatus further include a user interface configured to obtain a global transparency value based on an alpha input from a user, wherein the plurality of content preservation values is based on the global transparency value. Some examples of the system and the apparatus further include a user interface configured to obtain a mask softness value based on a softness input from a user.

In some aspects, the image generation model is further trained to generate the output image using a reverse diffusion process. In some aspects, the image generation model comprises a generative adversarial network (GAN) configured to generate the output image.

In some aspects, the image generation model is further configured to generate the output image based on a prompt. In some aspects, the image generation model comprises a text encoder configured to encode the prompt.

FIG. 1 shows an example of image generation system 100 according to aspects of the present disclosure. The example shown includes user 105, user device 110, image generation apparatus 115, cloud 120, and database 125.

Referring to FIG. 1, user 105 provides an input image, a prompt (such as a text prompt, an image prompt, etc.) describing content, an inpainting mask, and content preservation values for the inpainting mask to image generation apparatus 115 via a user interface provided on user device 110 by image generation apparatus 115.

In some cases, image generation apparatus 115 generates an output image by generating a noise image based on the input image and the inpainting mask and removing noise from the noise image according to the prompt and the content preservation values using an image generation model (such as the image generation model described with reference to FIG. 6). In some cases, image generation apparatus 115 provides the output image to user 105.

As used herein, a "prompt" refers to information that is used to guide an image generation process implemented by the image generation model. As used herein, "content" refers to any visual element (such as an object, entity, background, landscape, etc.) that is depicted in an image.

As used herein, an "inpainting mask" refers to an image, image layer, or other suitable data (such as a scalable vector file) that is used to identify a portion, region, area, etc. of an image, where a masked region of the mask corresponds to the portion, etc. of the image and a non-masked region of the mask corresponds to the remaining portions, etc. of the image. In some cases, by superimposing the mask with the image or otherwise combining the mask with the image, a masked region of the image may therefore be distinguished from a non-masked region of the image.

As used herein, a "mask band" refers to a group of one or more pixels from an inpainting mask. In some cases, a mask band is an inpainting mask as described herein. In some cases, each pixel of a mask band is opaque. In some cases, each mask band corresponds to a separate masked region of an image that a set of mask bands is applied to.

As used herein, a "transparency value" refers to a value between 0 and 1, inclusive, of a transparency of a pixel of an inpainting mask, where a value of 0 indicates that the pixel is transparent, a value of 1 indicates that the pixel is opaque, and a value between 0 and 1 indicates that the pixel is semi-transparent. As used herein, a "content preservation value" refers to a numeric representation corresponding to at least one pixel of an inpainting mask of a degree of content that should be preserved in a generated image from at least one pixel of the input image corresponding to the at least one pixel of the inpainting mask. In some cases, a content preservation value is visually represented by a transparency of a pixel of the inpainting mask corresponding to a transparency value. In some cases, a content preservation value and a transparency value are inversely correlated (e.g., a pixel including a transparency value of 0 includes a content preservation value of 1, indicating that a maximum amount of content from the pixel is to be preserved from a transparent pixel).

In some cases, a set of content preservation values refer to a numeric representation corresponding to a set of gradually increasing transparencies for the pixels of the inpainting mask from a baseline transparency of the inpainting mask (e.g., the global transparency value). In some examples, each of the mask bands corresponds to a different content preservation value. In some cases, the set of content preservation values are provided by user 105 and correspond to different regions of the inpainting mask.

According to some aspects, user device 110 is a personal computer, laptop computer, mainframe computer, palmtop computer, personal assistant, mobile device, or any other suitable processing apparatus. In some examples, user device 110 includes software that displays the user interface (e.g., a graphical user interface) provided by image generation apparatus 115. In some aspects, the user interface allows information (such as an image, a prompt, user inputs, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 6 and 14. According to some aspects, image generation apparatus 115 includes a computer-implemented network. In some embodiments, the computer-implemented network includes a machine learning model (such as the image generation model described with reference to FIG. 6). In some embodiments, image generation apparatus 115 also includes one or more processors, a memory subsystem, a communication interface, an I/O interface, one or more user interface components, and a bus as described with reference to FIG. 14. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 6-8 and 14. Further detail regarding a process for image generation is provided with reference to FIGS. 2-5 and 9-12. Examples of a process for image generation using a user interface are provided with reference to FIG. 13.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet.

Some large cloud networks have functions distributed over multiple locations from central servers. A server is designated an edge server if it has a direct or close connection to a user. In some cases, cloud 120 is limited to a single organization. In other examples, cloud 120 is available to many organizations.

In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, an aspect of the present disclosure is used in an image inpainting context. For example, a user uses an image generation system (such as the image generation system described with reference to FIG. 1) to inpaint content described by a prompt into an original image.

At operation 205, a user provides an input image, a prompt, an inpainting mask, and content preservation values for the mask to the image generation system. In some cases, the operations of this step refer to, or may be performed by, a user as described with reference to FIG. 1. For example, in some cases, the image generation system provides a user interface (such as a graphical user interface) on a user device (such as the user device described with reference to FIG. 1), and the user provides the input image, the prompt, the inpainting mask, and the content preservation values for the mask to the image generation system via the user interface.

In some cases, the prompt is a text prompt. In some cases, the prompt is an image prompt. In some cases, the prompt is provided in another modality that can describe content to be depicted in an image. In some cases, the user provides the inpainting mask as a separate image from the input image. In some cases, the user provides the inpainting mask as a layer of the input image. In some cases, the user provides a selection of one or more pixels of the input image using the user interface (for example, via a brush tool of the user interface), and the image generation system generates a mask corresponding to the selection of the one or more pixels. In some cases, the user provides the content preservation values by entering the content preservation values in an element of the user interface. In some cases, the user provides the content preservation values by using a selection tool (such as a mask softness brush tool) of the user interface.

At operation 210, the system generates an output image depicting a blend of content from the input image and the prompt using an image generation model based on the inpainting mask and the content preservation values. In some cases, the operations of this step refer to, or may be performed by, an image generation apparatus as described with reference to FIGS. 1, 6, and 14. For example, in some cases, the image generation system generates the output image as described with reference to FIG. 9.

At operation 215, the system displays the output image to the user. In some cases, the operations of this step refer to, or may be performed by, an image generation apparatus as described with reference to FIGS. 1, 6, and 14. For example, in some cases, the image generation apparatus displays the output image to the user via the user interface.

Figure 3:
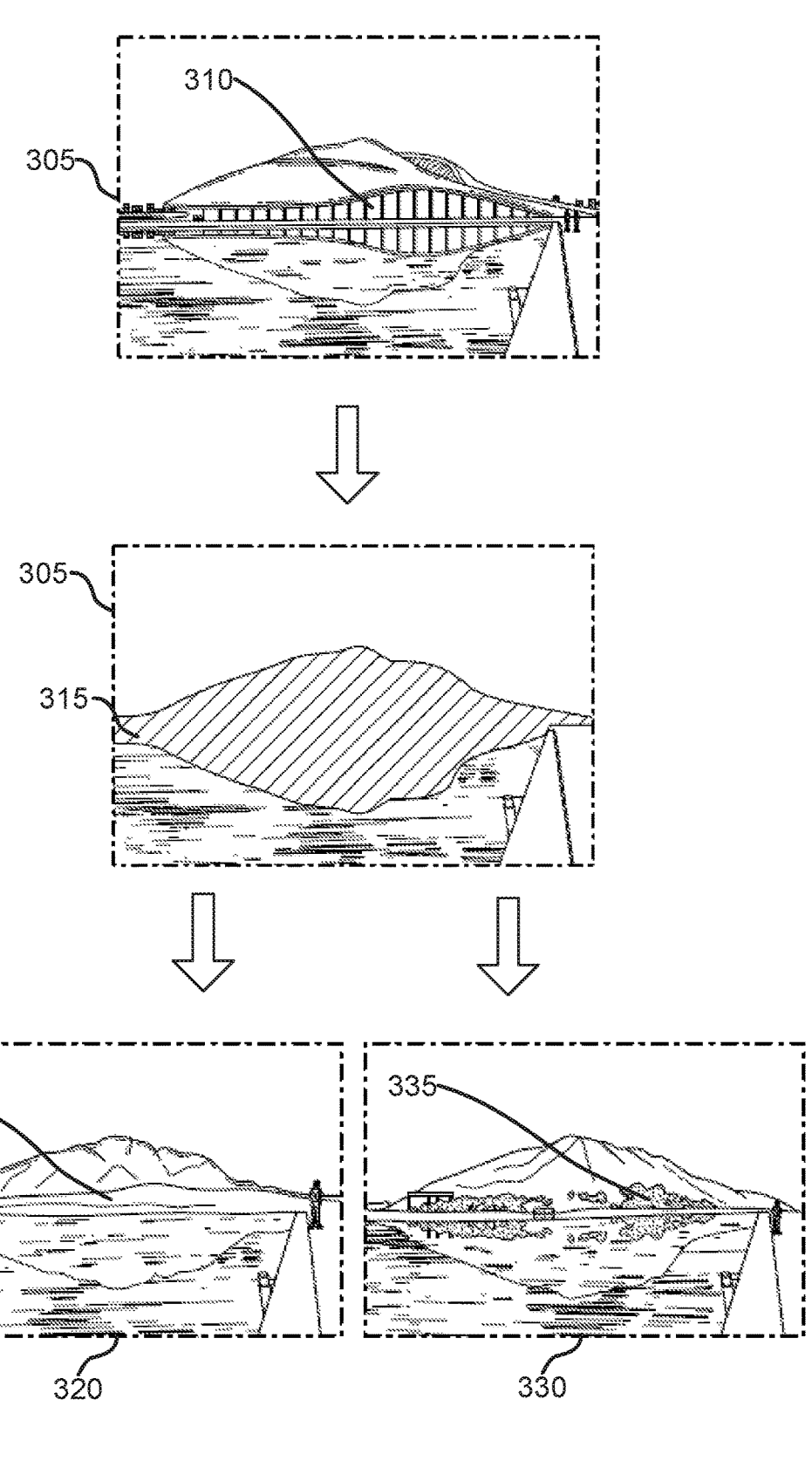
FIG. 3 shows a first example of generating an image based on an inpainting mask corresponding to a global transparency value according to aspects of the disclosure.

FIG. 3 shows a first example 300 of generating an image based on an inpainting mask having a global transparency value according to aspects of the present disclosure. The example shown includes input image 305, inpainting mask 315, first output image 320, and second output image 330.

Referring to FIG. 3, according to some aspects, inpainting mask 315 is obtained (for example, via a brush tool input provided by a user indicating an inpainting region) for input image 305. Input image 305 depicts a building, with a portion of building 310 including visible interior lighting, a lake including a reflection of the building, a dock, and a sky. Inpainting mask 315 is obtained to include pixels corresponding to pixels of input image 305 depicting the building and the reflection of the building.

In the example of FIG. 3, an image generation apparatus (such as the image generation apparatus described with reference to FIGS. 1, 6, and 14) generates a noise image by adding noise to input image 305 in a region identified by inpainting mask 315.

The image generation apparatus generates first output image 320 and second output image 330 by removing noise from the noise image during an image generation process using an image generation model (such as the image generation model described with reference to FIG. 6) guided by a text prompt "snowy mountain". Each of first output image 320 and second output image 330 correspond to a different global transparency value for inpainting mask 315. In some cases, each of the global transparency values corresponds to a different weighting of the prompt during the image generation process, such that a more transparent mask means that the prompt has more weight during the image generation process, while a more opaque mask means that the prompt has less weight during the image generation process.

First output image 320 shows a similar image to input image 305, where the building and the reflection of the building have been replaced by a snowy mountain and a reflection of the snowy mountain. Due to a first global transparency value, the portion of the building 310 including the interior lighting has been "translated" to a light-colored portion of the mountain 325 that appears to depict reflected sunlight.

Second output image 330 is similar to first output image 320, but instead of depicting a snowy mountain including a sunlit portion, the mountain includes a portion 335 that depicts distant electric lights. Because a global transparency value is greater than the first transparency value, more content from input image 305 (e.g., high-level features such as interior electric lighting of the building) is preserved in second output image 330 than in first output image 320. Furthermore, both first output image 320 and second output image 330 include realistic depictions of a reflection of the mountain, including a realistic depiction of water, that have replaced the reflection of the building of input image 305. Accordingly, the image generation apparatus may generate multiple output images based on an input image, a text prompt, and an inpainting mask with varying global transparency values.

Figure 4:
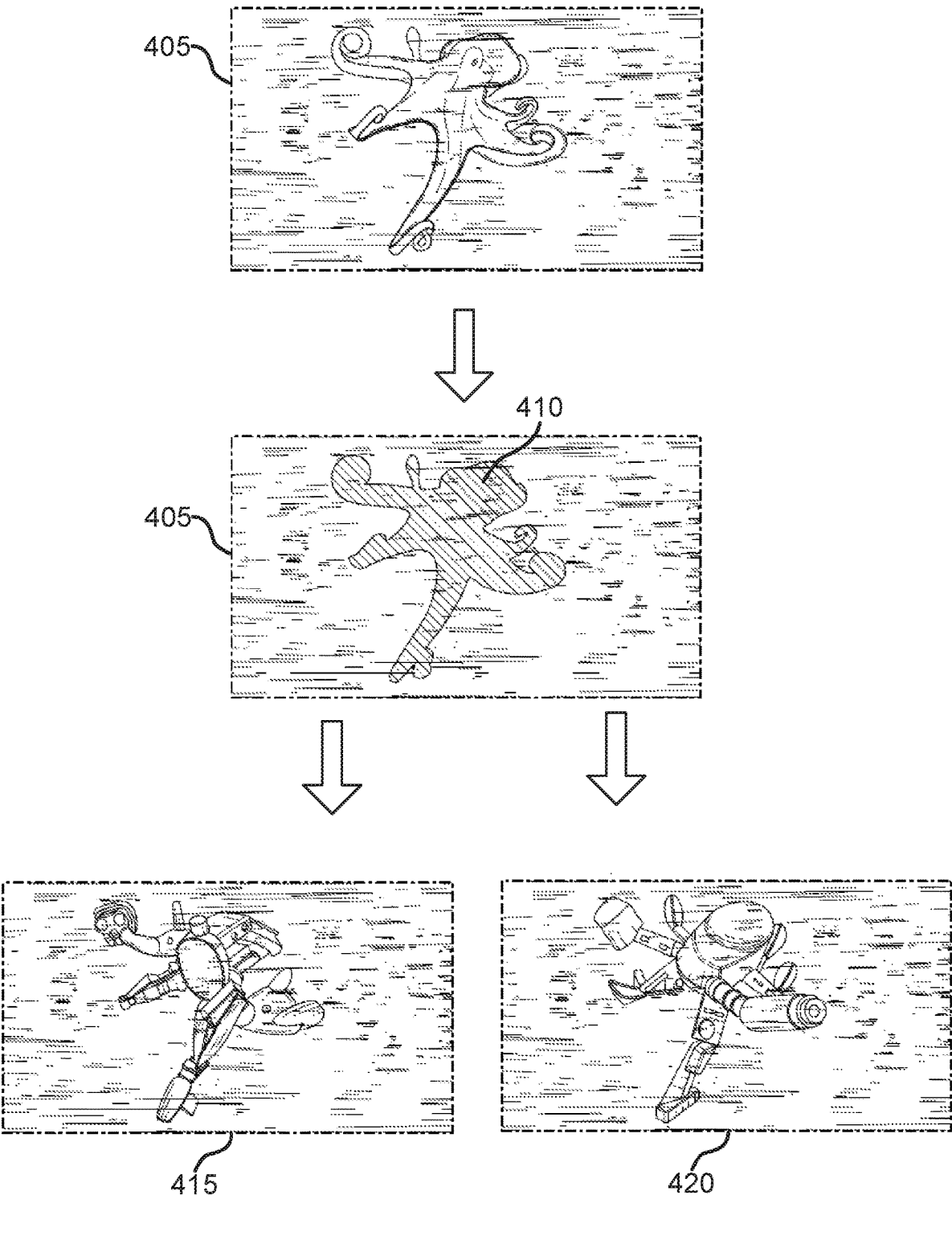
FIG. 4 shows a second example of generating an image based on an inpainting mask corresponding to a global transparency value according to aspects of the present disclosure.

FIG. 4 shows a second example 400 of generating an image based on an inpainting mask having a global transparency value according to aspects of the present disclosure. The example shown includes input image 405, inpainting mask 410, first output image 415, and second output image 420.

Referring to FIG. 4, input image 405 depicts an octopus in water. According to some aspects, first output image 415 and second output image 420 are generated based on input image 405, inpainting mask 410, a text prompt "an underwater detection robot", and respective first and second global transparency values for inpainting mask 410 as described with reference to FIG. 3, and a repeated description thereof is omitted for the sake of brevity.

Second output image 420 is generated based on the second global transparency that is greater than the first global transparency used for generating first output image 415. Accordingly, as shown in FIG. 4, second output image 420 depicts a robot that is visually influenced by the octopus of input image 405 to a greater degree than a robot depicted in first output image 415.

Figure 5:
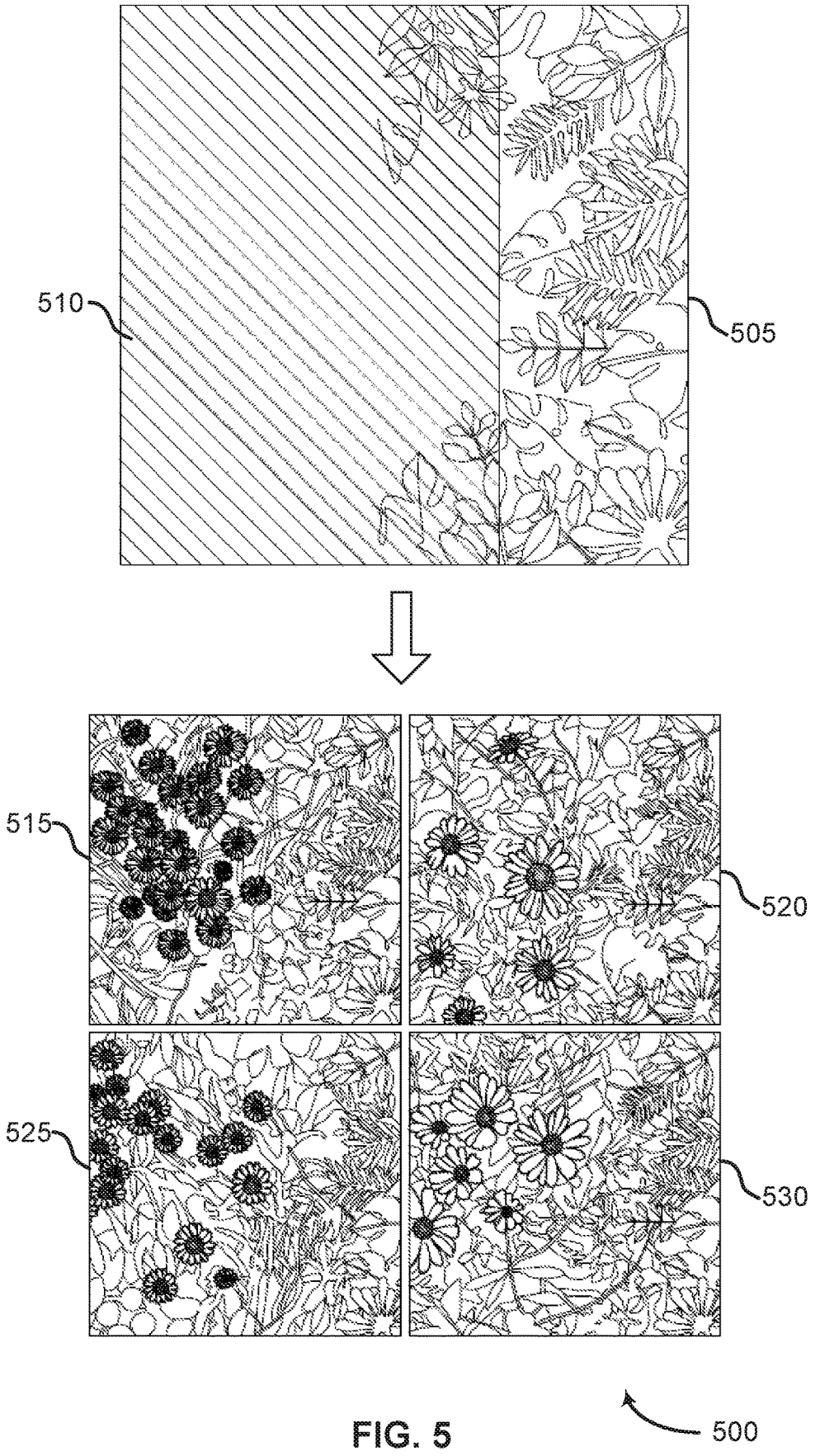
FIG. 5 shows an example of generating an image based on an inpainting mask corresponding to a set of transparency values according to aspects of the present disclosure.

FIG. 5 shows an example 500 of generating an image based on an inpainting mask having a set of transparency values according to aspects of the present disclosure. The example shown includes input image 505, inpainting mask 510, first output image 515, second output image 520, third output image 525, and fourth output image 530.

Referring to FIG. 5, input image 505 depicts a group of leafy plants. According to some aspects, inpainting mask 510 overlaps input image 505 and is displayed with a set of transparency values corresponding to a set of content preservation values provided by the user. For example, in some cases, pixels on the left side of inpainting mask 510 are the most opaque among all of the pixels of inpainting mask 510.

In some cases, the transparencies of the most opaque pixels are set by a global transparency value. As shown in FIG. 5, pixels on the right side of inpainting mask 510 have an increased transparency from the pixels on the left side, allowing portions of input image 505 to be visible through inpainting mask 510. In some cases, the increased transparency of the pixels on the right side of inpainting mask 510 correspond to content preservation values for inpainting mask 510.

First through fourth output images 515 through 530 are generated based on input image 505, inpainting mask 510, a text prompt such as "yellow daisies", and respectively corresponding first through fourth global transparency values as described with reference to FIG. 3, and a repeated description thereof is omitted for the sake of brevity. Furthermore, as shown in first through fourth output images 515 through 530, a blending between content from input image 505 and content from the prompt corresponding to a softness of inpainting mask 510 set by the content preservation values is achieved.

Figure 6:
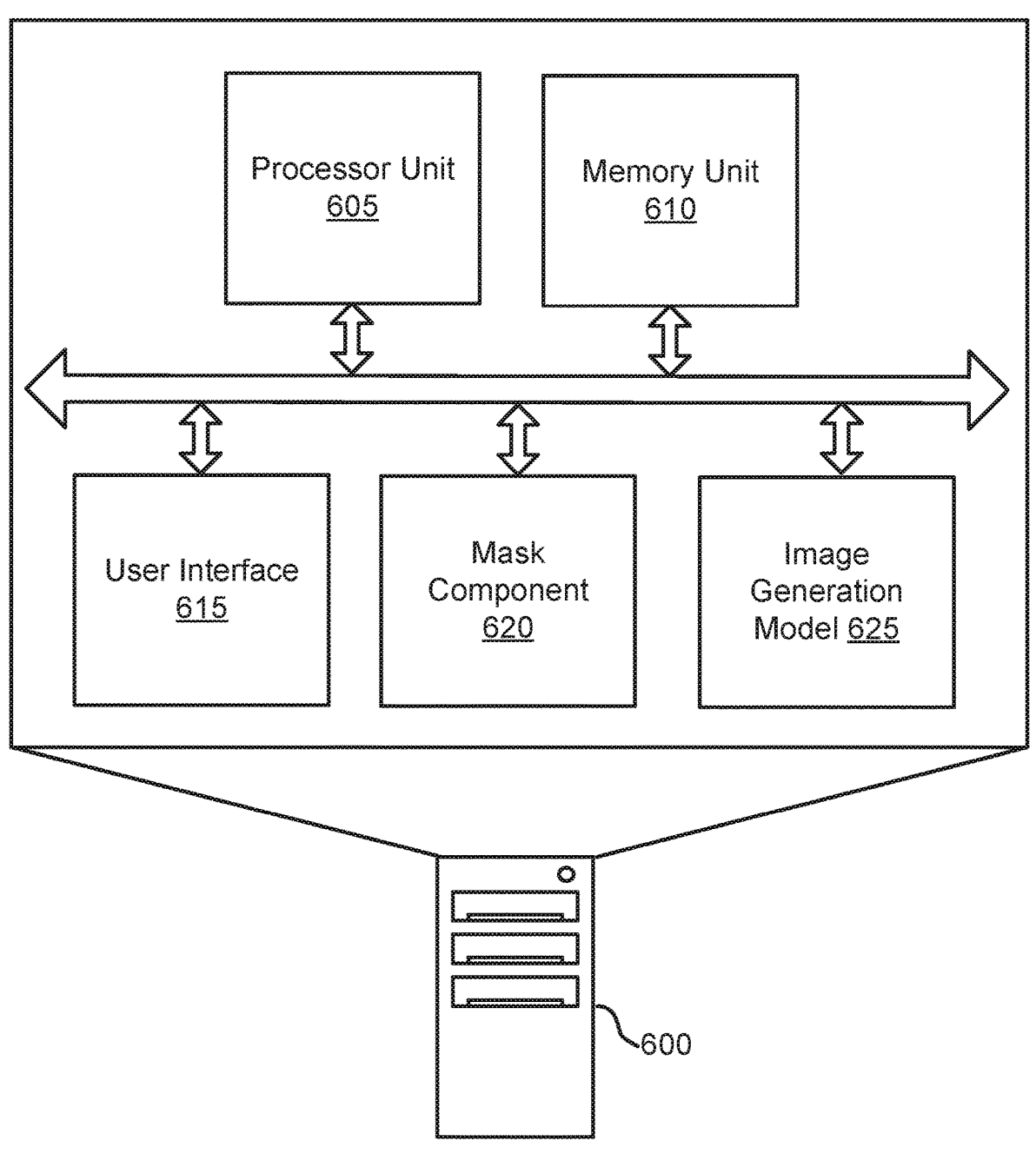
FIG. 6 shows an example of an image generation apparatus according to aspects of the present disclosure.

FIG. 6 shows an example of an image generation apparatus 600 according to aspects of the present disclosure. Image generation apparatus 600 is an example of, or includes aspects of, the corresponding element described with reference to FIGS. 1 and 14. In one aspect, image generation apparatus 600 includes processor unit 605, memory unit 610, user interface 615, mask component 620, and image generation model 625.

Processor unit 605 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 605 is configured to operate a memory array using a memory controller. In other cases, a memory controller is integrated into processor unit 605. In some cases, processor unit 605 is configured to execute computer-readable instructions stored in memory unit 610 to perform various functions. In some aspects, processor unit 605 includes special purpose components for modem processing, baseband processing, digital signal processing, or transmission processing. According to some aspects, processor unit 605 comprises the one or more processors described with reference to FIG. 14.

Memory unit 610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 605 to perform various functions described herein.

In some cases, memory unit 610 includes a basic input/output system (BIOS) that controls basic hardware or software operations, such as an interaction with peripheral components or devices. In some cases, memory unit 610 includes a memory controller that operates memory cells of memory unit 610. For example, the memory controller may include a row decoder, column decoder, or both. In some cases, memory cells within memory unit 610 store information in the form of a logical state. According to some aspects, memory unit 610 comprises the memory subsystem described with reference to FIG. 14.

According to some aspects, image generation apparatus 600 uses at least one processor included in processor unit 605 to execute instructions stored in at least one memory device included in memory unit 610 to perform operations.

For example, according to some aspects, image generation apparatus 600 obtains an input image, an inpainting mask, and a set of content preservation values corresponding to different regions of the inpainting mask. In some examples, image generation apparatus 600 obtains a mask softness value, where at least one of the set of content preservation values is based on the mask softness value. In some examples, image generation apparatus 600 obtains a prompt describing content to be depicted in the output image, where the output image is generated based on the prompt. In some aspects, the prompt includes a text prompt.

User interface 615 is an example of, or includes aspects of, the corresponding element described with reference to FIGS. 3-5. According to some aspects, user interface 615 is implemented as software stored in memory unit 610 and executable by processor unit 605, as firmware, as one or more hardware circuits, or as a combination thereof. In some cases, user interface 615 is implemented as a graphical user interface. In some cases, image generation apparatus 600 provides user interface 615 on a user device (such as the user device described with reference to FIG. 1).

According to some aspects, the inpainting mask is obtained from a user selection via user interface 615. In some examples, user interface 615 displays the inpainting mask overlapping the input image, where the inpainting mask is displayed with a set of transparency values corresponding to the set of content preservation values.

According to some aspects, user interface 615 receives an area selection indicating a region of the input image. In some examples, user interface 615 receives a content preservation value. In some examples, user interface 615 receives a mask softness value, where the set of mask bands are identified based on the mask softness value.

According to some aspects, user interface 615 is configured to obtain the inpainting mask based on an inpainting region indicated by a user. In some examples, user interface 615 is configured to obtain a global transparency value based on an alpha input from a user, wherein the plurality of content preservation values is based on the global transparency value. In some examples, user interface 615 is configured to obtain a mask softness value based on a softness input from a user.

According to some aspects, mask component 620 is implemented as software stored in memory unit 610 and executable by processor unit 605, as firmware, as one or more hardware circuits, or as a combination thereof. According to some aspects, mask component 620 identifies a set of mask bands of the inpainting mask based on the set of content preservation values.

According to some aspects, image generation model 625 comprises machine learning parameters stored in memory unit 610. Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a degree of connections between neurons and influence the neural network's ability to capture complex patterns in data. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 625 is implemented as software stored in memory unit 610 and executable by processor unit 605, as firmware, as one or more hardware circuits, or as a combination thereof.

According to some aspects, image generation model 625 comprises one or more ANNs configured, designed, and/or trained to generate an output image based on the input image and the inpainting mask. According to some aspects, the output image is generated in a set of phases, and where each of the set of phases uses a corresponding mask band of the set of mask bands as an input. In some aspects, the output image depicts, in an area corresponding to the inpainting mask, a blend of content from the input image and the content described by the prompt. In some aspects, the output image is generated using a reverse diffusion process. In some aspects, the set of phases correspond to a set of steps of the reverse diffusion process. In some aspects, the output image is generated using a generative adversarial network (GAN). In some aspects, the set of phases correspond to layers of the GAN.

According to some aspects, image generation model 625 generates an output image based on the input image, where the output image is generated in a set of phases, and where each of the set of phases is based on a different mask band of a set of mask bands corresponding to the region of the input image based on the content preservation value.

In some aspects, the image generation model 625 is further configured to generate the output image based on a prompt. In some aspects, the image generation model 625 includes a text encoder (such as the encoder described with reference to FIG. 7) configured to encode the prompt. In some aspects, the output image depicts, in an area corresponding to the inpainting mask, a blend of content from the input image and content described by the prompt.

In some aspects, image generation model 625 comprises a diffusion model (such as the diffusion model described with reference to FIG. 7) and the output image is generated using a reverse diffusion process. A diffusion model is a class of ANN that is trained to generate an image by learning an underlying probability distribution of the training data that allows the model to iteratively refine the generated image using a series of diffusion steps. In some cases, a reverse diffusion process of the diffusion model starts with a noise vector or a randomly initialized image. In each diffusion step of the reverse diffusion process, the model applies a sequence of transformations (such as convolutions, up-sampling, down-sampling, and non-linear activations) to the image, gradually "diffusing" the original noise or image to resemble a real sample. During the reverse diffusion process, the diffusion model estimates the conditional distribution of the next image given the current image (for example, using a CNN or a similar architecture). In some cases, a reverse diffusion process can be guided by a prompt (such as a text prompt) such that the output of the reverse diffusion process includes, to some degree, content indicated by the prompt.

In some aspects, image generation model 625 comprises a GAN and the output image is generated using a generator network of the GAN. A GAN is class of ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The training objective of the generator is to increase an error rate of the discriminator by producing novel candidates that the discriminator classifies as "real" (e.g., belonging to the true data distribution). Therefore, given a training set, the GAN learns to generate new data with similar properties as the training set. A GAN may be trained via supervised learning, semi-supervised learning, unsupervised learning, or reinforcement learning. In some cases, a GAN can be guided by a prompt (such as a text prompt) such that the output of the GAN includes, to some degree, content indicated by the prompt.

In some cases, image generation model 625 comprises a U-Net (such as the U-Net described with reference to FIG. 8).

Figure 7:
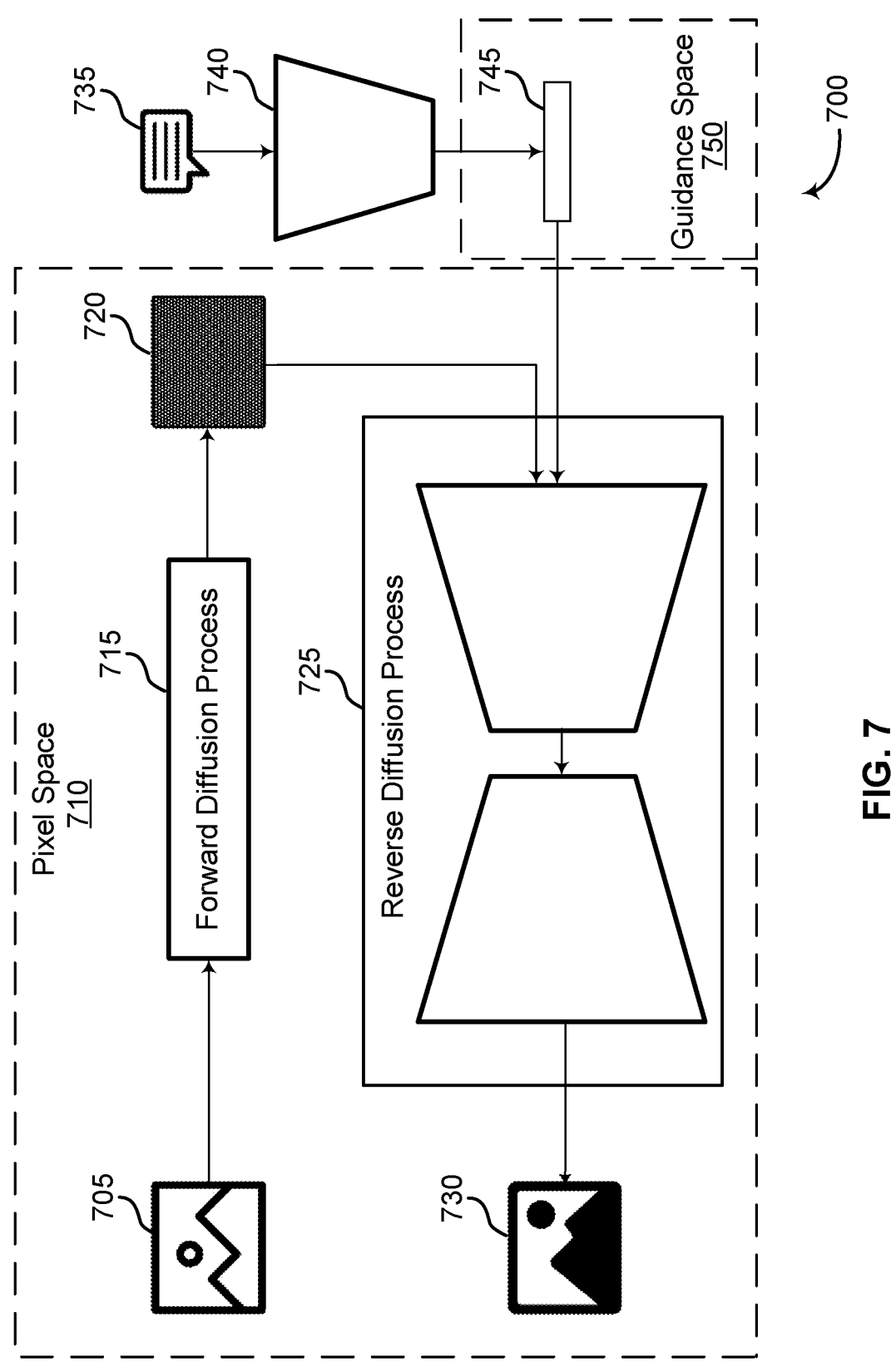
FIG. 7 shows an example of a guided diffusion architecture according to aspects of the present disclosure.

FIG. 7 shows an example of a guided diffusion architecture 700 according to aspects of the present disclosure.

Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, as in pixel diffusion, or to image features generated by an encoder, as in latent diffusion.

For example, according to some aspects, forward diffusion process 715 gradually adds noise to original image 705 (e.g., an input image as described with reference to FIGS. 3-5) in a masked region in pixel space 710 to obtain noise images 720 at various noise levels. According to some aspects, reverse diffusion process 725 gradually removes the noise from noise images 720 at the various noise levels to obtain an output image 730 (such as the output images respectively described with reference to FIGS. 3-5). In some cases, reverse diffusion process 725 is implemented via a U-Net ANN (such as the U-Net architecture described with reference to FIG. 8). In some cases, reverse diffusion process 725 is implemented by the image generation model described with reference to FIG. 6. Forward diffusion process 715 and reverse diffusion process 725 are examples of, or include aspects of, the corresponding elements described with reference to FIG. 11.

In some cases, an output image 730 is created from each of the various noise levels. According to some aspects, the output image 730 is compared to original image 705 to train reverse diffusion process 725.

Reverse diffusion process 725 can also be guided based on a guidance prompt such as text prompt 735, an image, a layout, a segmentation map, etc. Text prompt 735 is encoded using text encoder 740 (in some cases, a multimodal encoder) to obtain guidance features 745 in guidance space 750.

According to some aspects, guidance features 745 are combined with noise images 720 at one or more layers of reverse diffusion process 725 to ensure that output image 730 includes content described by text prompt 735 in the masked region. For example, guidance features 745 can be combined with noise images 720 using a cross-attention block within reverse diffusion process 725. In some cases, guidance features 745 can be weighted so that guidance features 745 have a greater or lesser representation in output image 730.

An attention mechanism is a key component in some ANN architectures, particularly ANNs employed in natural language processing (NLP) and sequence-to-sequence tasks, that allows an ANN to focus on different parts of an input sequence when making predictions or generating output. NLP refers to techniques for using computers to interpret or generate natural language. In some cases, NLP tasks involve assigning annotation data such as grammatical information to words or phrases within a natural language expression.

Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Some sequence models (such as RNNs) process an input sequence sequentially, maintaining an internal hidden state that captures information from previous steps. However, this sequential processing can lead to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains its current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

By incorporating an attention mechanism, an ANN can dynamically allocate attention to different parts of the input sequence, allowing the ANN to focus on relevant information and capture dependencies across longer distances.

Cross-attention, also known as multi-head attention, is an extension of the attention mechanism used in some ANNs for NLP tasks. In some cases, cross-attention enables reverse diffusion process 725 to attend to multiple parts of an input sequence simultaneously, capturing interactions and dependencies between different elements. In cross-attention, there are typically two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing reverse diffusion process 725 to better understand the context and generate more accurate and contextually relevant outputs.

As shown in FIG. 7, guided diffusion architecture 700 is implemented according to a pixel diffusion model. In some embodiments, guided diffusion architecture 700 is implemented according to a latent diffusion model. In a latent diffusion model, an image encoder first encodes original image 705 as image features in a latent space. Then, forward diffusion process 715 adds noise to the image features, rather than original image 705, to obtain noisy image features. Reverse diffusion process 725 gradually removes noise from the noisy image features (in some cases, guided by guidance features 745) to obtain denoised image features. An image decoder decodes the denoised image features to obtain output image 730 in pixel space 710. In some cases, as a size of image features in a latent space can be significantly smaller than a resolution of an image in a pixel space (e.g., 32, 64, etc. versus 256, 512, etc.), encoding original image 705 to obtain the image features can reduce inference time by a large amount.

Figure 8:
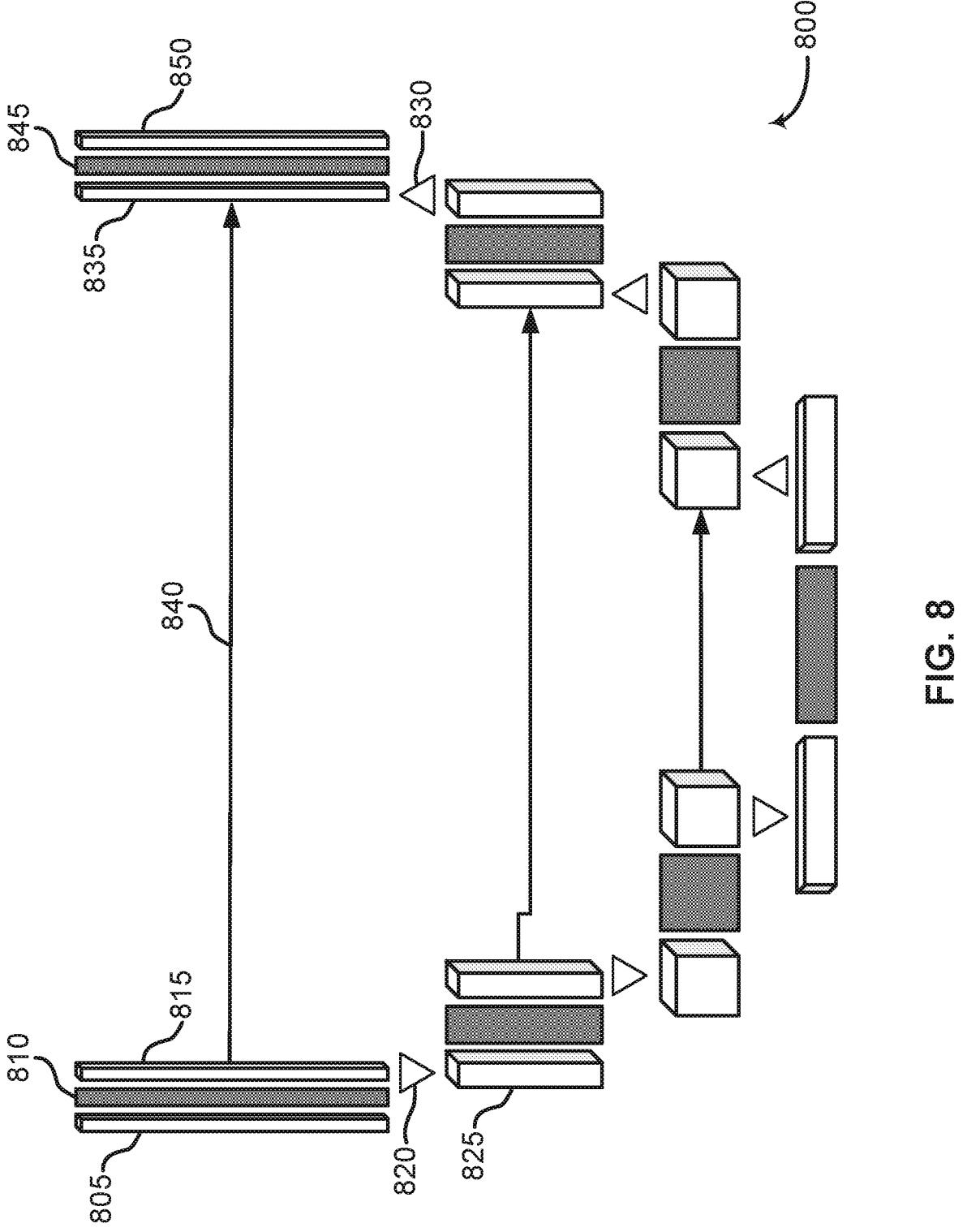
FIG. 8 shows an example of a U-Net according to aspects of the present disclosure.

FIG. 8 shows an example of a U-Net according to aspects of the present disclosure. According to some aspects, an image generation model (such as the image generation model described with reference to FIG. 6) comprises an ANN architecture known as a U-Net. In some cases, U-Net 800 implements the reverse diffusion process described with reference to FIGS. 7 and 11. In some cases, a GAN (such as the GAN described with reference to FIG. 6) comprises a U-Net.

According to some aspects, U-Net 800 receives input features 805, where input features 805 include an initial resolution and an initial number of channels, and processes input features 805 using an initial neural network layer 810 (e.g., a convolutional network layer) to produce intermediate features 815.

A convolution neural network (CNN) is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

In some cases, intermediate features 815 are then down-sampled using a down-sampling layer 820 such that down-sampled features 825 have a resolution less than the initial resolution and a number of channels greater than the initial number of channels.

In some cases, this process is repeated multiple times, and then the process is reversed. For example, down-sampled features 825 are up-sampled using up-sampling process 830 to obtain up-sampled features 835. In some cases, up-sampled features 835 are combined with intermediate features 815 having a same resolution and number of channels via skip connection 840. In some cases, the combination of intermediate features 815 and up-sampled features 835 are processed using final neural network layer 845 to produce output features 850. In some cases, output features 850 have the same resolution as the initial resolution and the same number of channels as the initial number of channels.

According to some aspects, U-Net 800 receives additional input features to produce a conditionally generated output. In some cases, the additional input features include a vector representation of an input prompt. In some cases, the additional input features are combined with intermediate features 815 within U-Net 800 at one or more layers. For example, in some cases, a cross-attention module is used to combine the additional input features and intermediate features 815.

Image Generation

A method for image generation using machine learning is described is described with reference to FIGS. 9-12. One or more aspects of the method include obtaining an input image, an inpainting mask, and a plurality of content preservation values corresponding to different regions of the inpainting mask; identifying a plurality of mask bands of the inpainting mask based on the plurality of content preservation values; and generating, using an image generation model, an output image based on the input image and the inpainting mask, wherein the output image is generated in a plurality of phases, and wherein each of the plurality of phases uses a corresponding mask band of the plurality of mask bands as an input. In some aspects, the inpainting mask is obtained from a user selection via a user interface.

Some examples of the method further include obtaining a mask softness value, wherein at least one of the plurality of content preservation values is based on the mask softness value. Some examples of the method further include displaying the inpainting mask overlapping the input image, wherein the inpainting mask is displayed with a plurality of transparency values corresponding to the plurality of content preservation values.

Some examples of the method further include obtaining a prompt describing content to be depicted in the output image, wherein the output image is generated based on the prompt. In some aspects, the prompt comprises a text prompt. In some aspects, the output image depicts, in an area corresponding to the inpainting mask, a blend of content from the input image and the content described by the prompt.

In some aspects, the output image is generated using a reverse diffusion process. In some aspects, the plurality of phases correspond to a plurality of steps of the reverse diffusion process. In some aspects, the output image is generated using a generative adversarial network (GAN). In some aspects, the plurality of phases correspond to layers of the GAN.

FIG. 9 shows an example of a method 900 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, according to some aspects, an image generation apparatus (such as the image generation system described with reference to FIGS. 1, 6, and 14) generates, using an image generation model (such as the image generation model described with reference to FIG. 6), an output image based on an input image, an inpainting mask, and a set of content preservation values corresponding to different regions of the inpainting mask.

In some cases, the image generation apparatus identifies a set of mask bands of the inpainting mask based on the set of content preservation values. In some cases, the image generation model generates the output image in a set of phases, where each of the set of phases uses a corresponding mask band of the set of mask bands as an input.

Accordingly, in some cases, by iteratively using mask bands as input during different stages of the image generation process, the image generation model effectively makes different amounts of predictions of content for different areas of an output image corresponding to the different regions of the inpainting mask. Therefore, the image generation model is able to achieve a more realistic, user-controllable blending effect in the output image than conventional image generation systems are able to provide.

At operation 905, the system obtains an input image, an inpainting mask, and a set of content preservation values corresponding to different regions of the inpainting mask. In some cases, the operations of this step refer to, or may be performed by, an image generation apparatus as described with reference to FIGS. 1, 6, and 14.

For example, in some cases, a user (such as the user described with reference to FIG. 1) provides an input image to the image generation apparatus using a user device (such as the user device described with reference to FIG. 1). In some cases, the user provides the input image to the image generation apparatus via a user interface (such as the user interface described with reference to FIGS. 1 and 6) displayed on the user device by the image generation apparatus. In some cases, the image generation apparatus retrieves the input image from a data source (such as the database described with reference to FIG. 1 or from another data source, such as the Internet).

In some cases, the user provides the inpainting mask to the image generation apparatus (for example, via the user interface). In some cases, the user provides the inpainting mask as a separate image from the input image. In some cases, the user provides the inpainting mask as a layer of the input image. In some cases, the user provides an inpainting region indication by selecting one or more pixels of the input image using the user interface (for example, via a brush tool of the user interface), and the image generation system generates a mask corresponding to the selection of the one or more pixels.

In some cases, the user provides the set of content preservation values to the image generation apparatus via the user interface. In some cases, the user provides the set of content preservation values via a text input or a user element input (such as a brush tool, a slider input, a button selection, etc.).

In some cases, the image generation apparatus obtains a mask softness value, where at least one of the set of content preservation values is based on the mask softness value. For example, in some cases, the user provides a softness input for the inpainting mask to the user interface (for example, via a softness brush tool), where the content preservation values are represented as gradations of pixels having increasing transparencies, where the number of gradations is equal to the mask softness value.

In some cases, the user interface obtains a global transparency value for the inpainting mask (for example, via an alpha input from a user). In some cases, the global transparency value indicates a baseline transparency value for the pixels of the inpainting mask. In some cases, a global transparency value is a value within a range of 0 to 1, where a value of 1 indicates that the inpainting mask is opaque and a value of 0 indicates that the inpainting mask is transparent. In some cases, the set of content preservation values represent a set of gradually increasing transparencies for the pixels of the inpainting mask from a baseline transparency of the inpainting mask (e.g., the global transparency value).

In some cases, the image generation apparatus obtains a prompt describing content to be depicted in the output image. In some cases, a user provides the prompt to the user interface. In some cases, the prompt is a text prompt. In some cases, the prompt is an image prompt. In some cases, the prompt is provided in another modality that can describe content to be depicted in an image.

In some cases, the user interface displays the inpainting mask overlapping the input image, wherein the inpainting mask is displayed with a plurality of transparency values corresponding to the plurality of content preservation values. In some cases, the transparencies of the inpainting mask are a visual representation of how much content from the masked region of the input image will be preserved in the output image, where an increased transparency is a representation of an increased preservation of content. Accordingly, in some cases, the image generation system provides an efficient visual metaphor for content preservation that allows a non-expert user to easily make adjustments to achieve a desired effect in an output image.

At operation 910, the system identifies a set of mask bands of the inpainting mask based on the set of content preservation values. In some cases, the operations of this step refer to, or may be performed by, a mask component as described with reference to FIG. 6.

For example, in some cases, the mask component receives the inpainting mask and the set of content preservation values and identifies a set of mask bands based on the set of content preservation values. In some cases, each of the mask bands corresponds to a content preservation value. In some cases, the number of mask bands is equal to the mask softness value. In some cases, each of the mask bands is uniform (e.g., having one or more of a uniform number of pixels, a uniform width, a uniform shape, etc.). In some cases, each pixel of a mask band is opaque. An example of identifying a set of mask bands is described with reference to FIG. 10.

At operation 915, the system generates, using an image generation model, an output image based on the input image and the inpainting mask, where the output image is generated in a set of phases, and where each of the set of phases uses a corresponding mask band of the set of mask bands as an input. In some cases, the operations of this step refer to, or may be performed by, an image generation model as described with reference to FIG. 6.

According to some aspects, the image generation apparatus adds noise to pixels of the input image corresponding to pixels of the inpainting mask to obtain a noise image. In some cases, the noise image includes a set of masked regions corresponding to the set of mask bands, where each masked region corresponds to a different transparency value. In some cases, the image generation apparatus obtains the noise image using a forward diffusion process described with reference to FIG. 11.

According to some aspects, the image generation model generates an output image using an iterative denoising process initialized using the noise image. In some cases, the iterative denoising process includes a reverse diffusion process described with reference to FIG. 11. In some cases, the image generation model replaces the noisy pixels using a GAN (such as the GAN described with reference to FIG. 6), where ground-truth features in lower-level layers are replaced to retain information from the input image. In some cases, the denoising process is conditioned on the prompt. In some cases, the effect of the prompt on the output image is weighted according to the global transparency value.

In some cases, at each stage of the denoising process, the image generation model outputs an intermediate noise image by removing noise from each masked region of the noise image or the preceding intermediate noise image according to the image generation model's prediction of what the output image should look like.

According to some aspects, the denoising process includes a number of stages equal to the number of mask bands. In some cases, at each stage of the denoising process following the first stage, the image generation model replaces predicted noise in successively fewer partially denoised regions of the intermediate noise image with noise from the original noise image, where the order of replacement is determined by the content preservation values for the masked regions.

In an example, in some cases, the image generation model retains, in a second intermediate noise image, partial noise of a masked region of a first intermediate noise image corresponding to a lowest content preservation value of the inpainting mask; retains, in a third intermediate noise image, partial noise of masked regions of the second intermediate noise corresponding to both the lowest content preservation value and a second-lowest content preservation value of the inpainting mask; and so on, until the image generation model's predicted noise removal for a masked region corresponding to each content preservation value is only retained in the final intermediate noise image, i.e., the output image. An example of noise replacement using a set of mask bands is described with reference to FIG. 12. In some cases, the image generation apparatus displays the output image to the user via the user interface.

Accordingly, in some cases, the image generation model uses varying noise levels corresponding to content preservation values as input during the image generation process such that the image generation model effectively makes more predictions for the less-transparent regions of the masked input image than the more-transparent regions, resulting in an output image in which additional content gradually blends into content from the input image according to the content preservation values of the inpainting mask provided by the user. Therefore, in some cases, the image generation system provides an inpainted image that more realistically blends additional content with content from an input image than conventional image generation systems can provide.

Furthermore, according to some aspects, by weighting the effect of the prompt on the output image according to the global transparency value of the inpainting mask, the image generation model provides an intuitive mechanism for controlling a degree to which the input image informs the generated content of the output image.

Still further, in some cases, a display of a semi-transparent mask by a user interface helps a user to indicate how much content from the input image is to be preserved in the output image, and the image generation system therefore provides the user with a more flexible inpainting experience.

Figure 10:
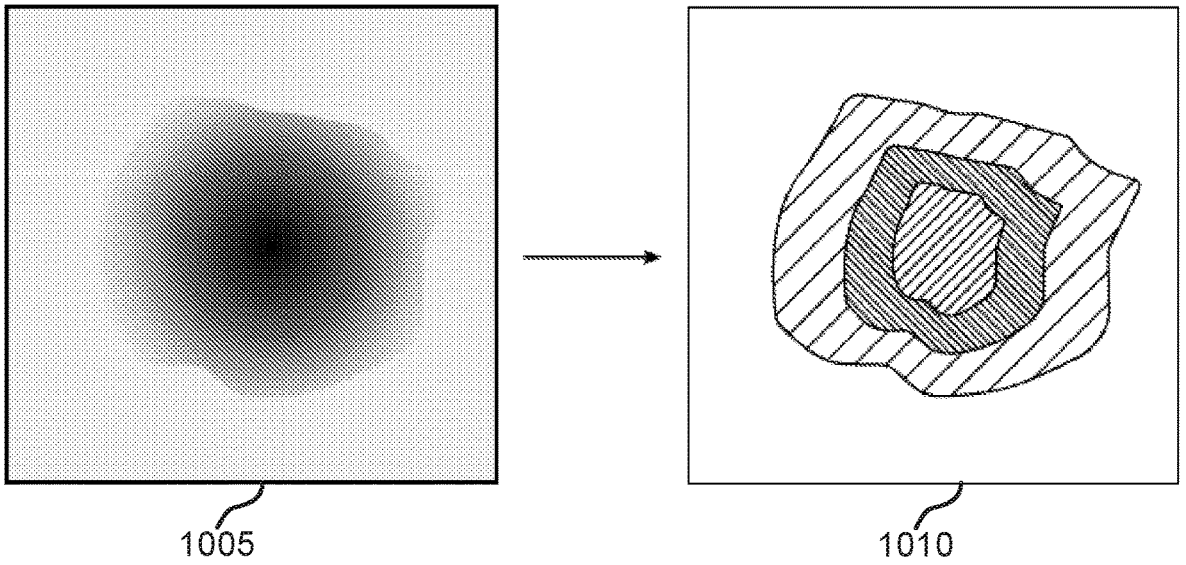
FIG. 10 shows an example of identifying a set of mask bands according to aspects of the present disclosure.

FIG. 10 shows an example 1000 of identifying a set of mask bands according to aspects of the present disclosure. The example shown includes inpainting mask 1005 and set of mask bands 1010.

In the example of FIG. 10, inpainting mask 1005 is a mask having a baseline global transparency value (e.g., 1, represented by the dark central portion of inpainting mask 1005), and a set of mask softness values, such that the inpainting mask includes bands of pixels having increased transparencies from the global transparency value (e.g., transparency values less than 1 and greater than or equal to 0).

In some cases, a mask component (such as the mask component described with reference to FIG. 6) quantizes inpainting mask 1005 into set of mask bands 1010. In some cases, the number of mask bands is equal to the mask softness value. In some cases, a number of sampling iterations of an image generation process is equal to the number of mask bands. In some cases, the number of sampling iterations is equal to a number of stages in a reverse diffusion process or to a depth of a network included in a GAN described with reference to FIG. 6. In the example of FIG. 10, set of mask bands 1010 includes three mask bands {$a_i$, $a_{i+1}$}, $0 \leq a_i \leq a_{i+1} < 1$, $1 \leq i < I$, where I=N total sampling iterations, and each of the three mask bands corresponds to a different content preservation value in the range of [0, 1].

Figure 11:
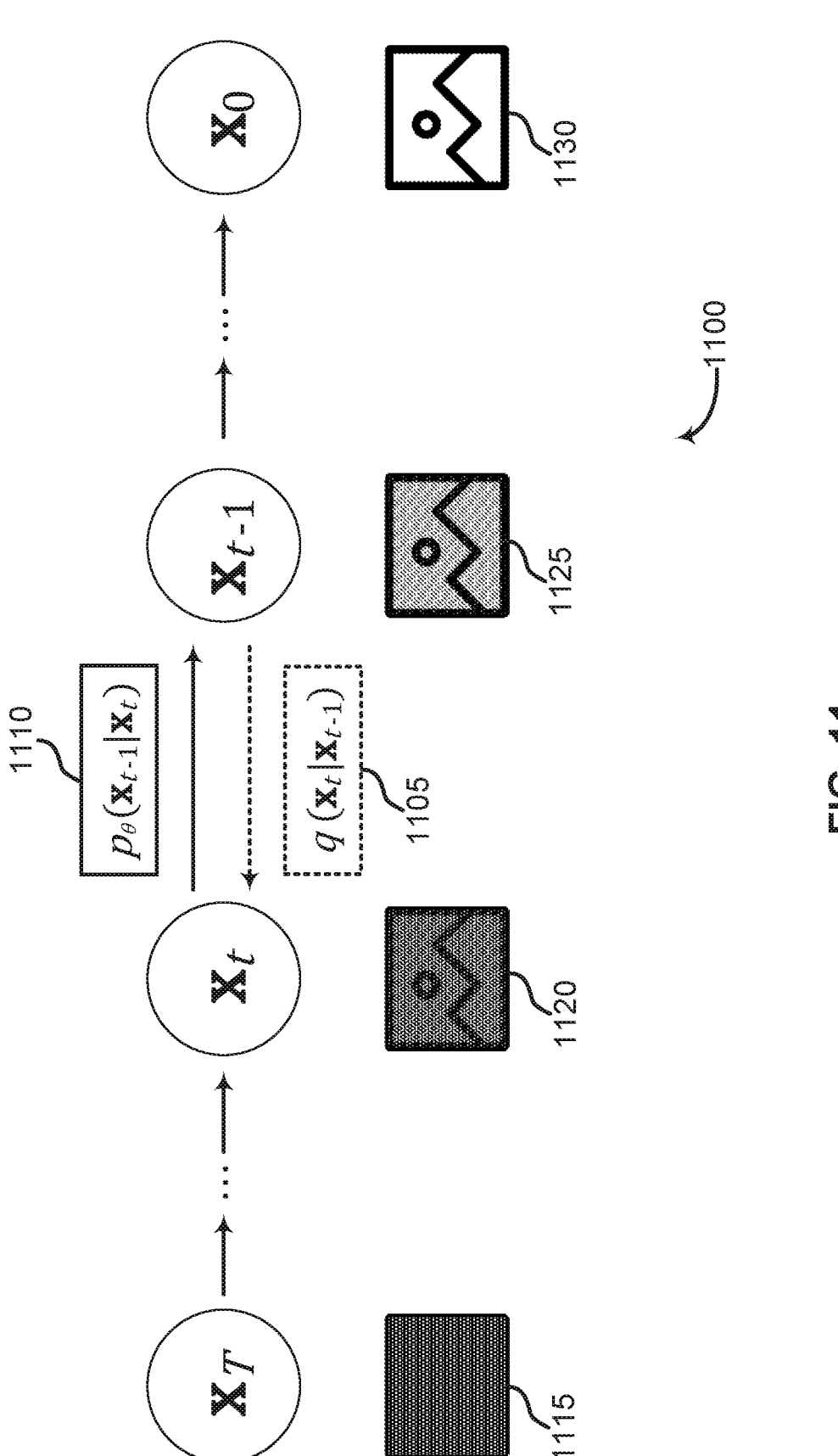
FIG. 11 shows an example of diffusion processes according to aspects of the present disclosure.

FIG. 11 shows an example 1100 of diffusion processes according to aspects of the present disclosure. The example shown includes forward diffusion process 1105 (such as the forward diffusion process described with reference to FIG. 7) and reverse diffusion process 1110 (such as the reverse diffusion process described with reference to FIG. 7). In some cases, forward diffusion process 1105 adds noise to an image (or image features in a latent space). In some cases, reverse diffusion process 1110 denoises the image (or image features in the latent space) to obtain a denoised image.

According to some aspects, an image generation apparatus (such as the image generation apparatus described with reference to FIGS. 1, 6, and 14) uses forward diffusion process 1105 to iteratively add Gaussian noise to an input at each diffusion step t according to a known variance schedule $0 < \beta_1 < \beta_2 < \cdots < \beta_T < 1$:

$$q(x_t \mid x_{t-1}) = \mathcal{N}\left(x_t; \sqrt{1 - \beta_t}\, x_{t-1}, \beta_t I\right) \qquad (1)$$

According to some aspects, the Gaussian noise is drawn from a Gaussian distribution with mean $\mu_t = \sqrt{1 - \beta_t} x_{t-1}$ and variance $\sigma^2 = \beta_t \geq 1$ by sampling $\epsilon \sim N(0, I)$ and setting $x_t = \sqrt{1 - \beta_t} x_{t-1} + \sqrt{\beta_t} \epsilon$. Accordingly, beginning with an initial input $x_0$, forward diffusion process 1005 produces $x_1, \ldots, x_t, \ldots x_T$, where $x_T$ is pure Gaussian noise.

In some cases, an observed variable $x_0$ (such as original image 1130) is mapped in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T} | x_0)$.

According to some aspects, during reverse diffusion process 1110, an image generation model (such as the image generation model described with reference to FIG. 6) gradually removes noise from $x_T$ to obtain a prediction of the observed variable $x_0$ (e.g., a representation of what the image generation model thinks the original image 1130 should be). In some cases, the prediction is influenced by a guidance prompt or a guidance vector (for example, a prompt or a prompt encoding described with reference to FIG. 7). A conditional distribution $p(x_{t-1}|x_t)$ of the observed variable $x_0$ is unknown to the image generation model, however, as calculating the conditional distribution would require a knowledge of a distribution of all possible images. Accordingly, the image generation model is trained to approximate (e.g., learn) a conditional probability distribution $p_\theta(x_{t-1}|x_t)$ of the conditional distribution $p(x_{t-1}|x_t)$:

$$p_\theta(x_{t-1} \mid x_t) = \mathcal{N}\left(x_{t-1}; \mu_\theta(x_t, t), \sum_\theta (x_t, t)\right) \qquad (2)$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the image generation model is trained to learn the mean and/or the variance.

According to some aspects, the image generation model initiates reverse diffusion process 1110 with noisy data $x_T$ (such as noisy image 1115). According to some aspects, the diffusion model iteratively denoises the noisy data $x_T$ to obtain the conditional probability distribution $p_\theta(x_{t-1}|x_t)$. For example, in some cases, at each step t−1 of reverse diffusion process 1110, the diffusion model takes $x_t$ (such as first intermediate image 1120) and t as input, where t represents a step in a sequence of transitions associated with different noise levels, and iteratively outputs a prediction of $x_{t-1}$ (such as second intermediate image 1125) until the noisy data $x_T$ is reverted to a prediction of the observed variable $x_0$ (e.g., a predicted image for original image 1130).

According to some aspects, a joint probability of a sequence of samples in the Markov chain is determined as a product of conditionals and a marginal probability:

$$x_T \colon p_\theta(x_{0:T}) := p(x_T) \prod_{t=1}^{T} p_\theta(x_{t-1} \mid x_t) \qquad (3)$$

In some cases, $p(x_T) = \mathcal{N}(x_T; 0, I)$ is a pure noise distribution, as reverse diffusion process 1110 takes an outcome of forward diffusion process 1105 (e.g., a sample of pure noise $x_T$) as input, and $$\prod_{t=1}^{T} p_\theta(x_{t-1} \mid x_t)$$

represents a sequence of Gaussian transitions corresponding to a sequence of addition of Gaussian noise to a sample.

Figure 12:
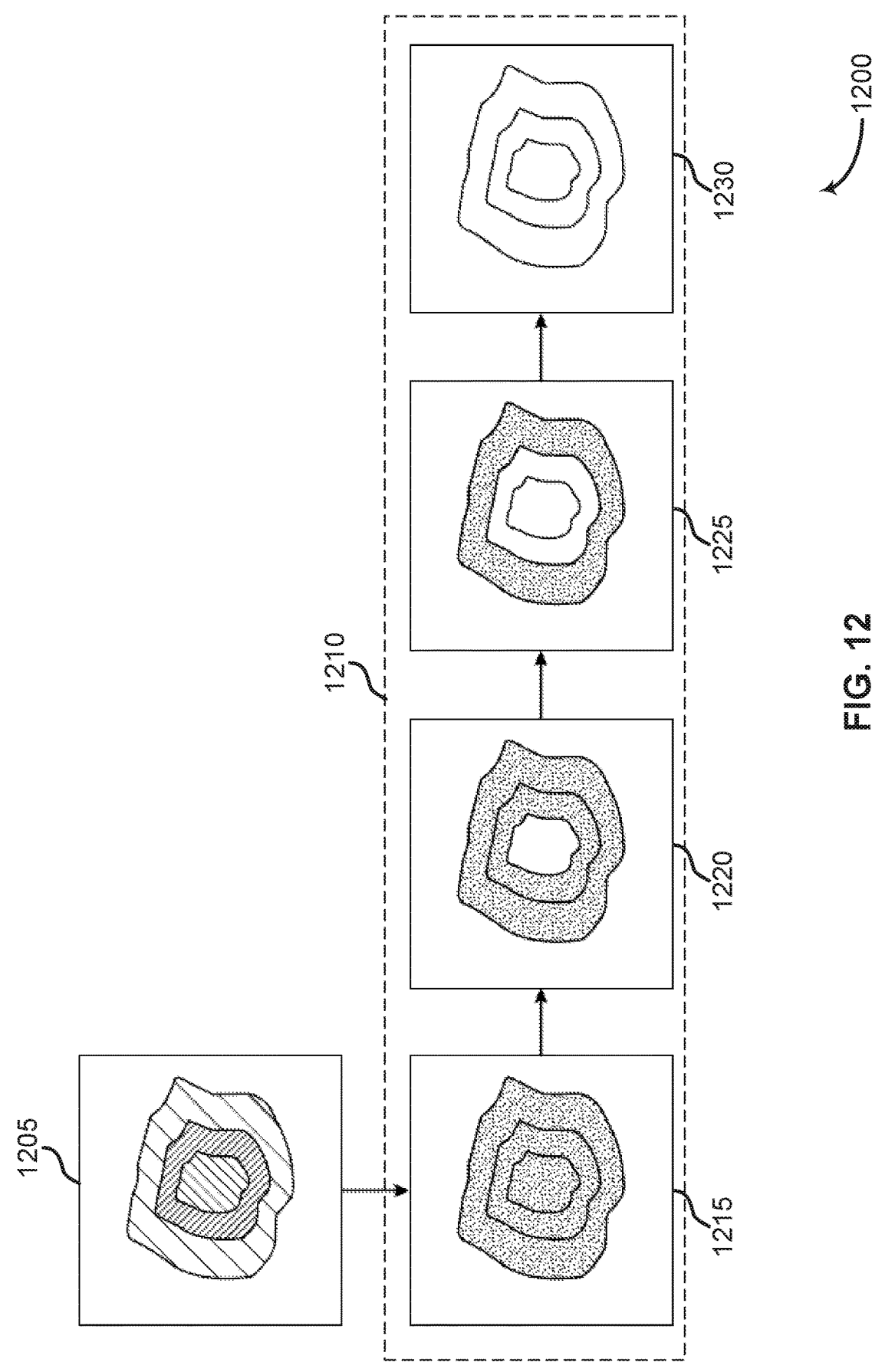
FIG. 12 shows an example of noise replacement using a set of mask bands according to aspects of the present disclosure.

FIG. 12 shows an example 1200 of noise replacement using a set of mask bands according to the present disclosure. The example shown includes set of mask bands 1205, denoising process 1210, noise image 1215, first intermediate noise image 1220, second intermediate noise image 1225, and output image 1230. Set of mask bands 1205 is an example of, or includes aspects of, the corresponding element described with reference to FIG. 11.

Referring to FIG. 12, in some cases, during each iteration i of a denoising process (such as a reverse diffusion process described with reference to FIG. 11), an image generation model (such as the image generation model described with reference to FIG. 6) makes a noise removal prediction for each masked region of an intermediate noise image and then replaces the predicted noise in masked regions corresponding to transparency values less than or equal to the value of the current stage of the denoising process with noise from an original noise image.

For example, as described with reference to FIG. 10, set of mask bands 1205 includes three mask bands $\{a_i, a_{i+1}\}$, $0 \le a_i \le a_{i+1} < 1$, $1 \le i < I$, where I=N total sampling iterations, each of the three mask bands corresponds to a different content preservation values, and therefore noise image 1215 includes three masked regions corresponding to different transparency values.

During denoising process 1210, the image generation model (such as the image generation model described with reference to FIG. 6) replaces predicted noise in masked regions of first intermediate noise image 1220 and second intermediate noise image 1225 corresponding to transparency values less than or equal to the value of $a_{i+1}$ with noise from noise image 1215.

Accordingly, in some cases, noise image 1215 includes noise in each of the three masked regions, first intermediate noise image 1220 includes predicted noise in a first masked region corresponding to a highest opacity (illustrated as a white central region) and noise from noise image 1215 in the two remaining masked regions (illustrated as two gray regions), second intermediate noise image 1225 includes predicted noise in the two masked regions corresponding to the highest opacities and noise from noise image 1215 in the remaining masked region, and output image includes the image generation models' prediction of content for each of the masked regions.

Therefore, in other words, in some cases, the image generation model effectively makes predictions for masked regions corresponding to higher opacities for a greater number of iterations of an image generation process than for masked regions corresponding to higher transparencies, which produces an effect of a grading from content of the input image to generated content in the output image. Accordingly, in some cases, the image generation system is able to realistically combine content from the input image with additional content in the output image (for example, via one or more of texture blending, color harmonization, boundary elimination, and the like), thereby providing a more realistic inpainted image than conventional image generation systems can provide.

Image Generation Using a User Interface

A method for image generation using machine learning is described with reference to FIG. 13. One or more aspects of the method include obtaining an input image; receiving, via a user interface, an area selection indicating a region of the input image; receiving, via the user interface, a content preservation value; and generating, using an image generation model, an output image based on the input image, wherein the output image is generated in a plurality of phases, and wherein each of the plurality of phases is based on a different mask band of a plurality of mask bands corresponding to the region of the input image based at least in part on the content preservation value.

Some examples of the method further include receiving, via the user interface, a mask softness value, wherein the plurality of mask bands are identified based on the mask softness value.

FIG. 13 shows an example of a method 1300 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system obtains an input image. In some cases, the operations of this step refer to, or may be performed by, an image generation apparatus as described with reference to FIGS. 1 and 6.

At operation 1310, the system receives, via a user interface, an area selection indicating a region of the input image. In some cases, the operations of this step refer to, or may be performed by, a user interface as described with reference to FIG. 6.

At operation 1315, the system receives, via the user interface, a content preservation value. In some cases, the operations of this step refer to, or may be performed by, a user interface as described with reference to FIG. 6.

At operation 1320, the system generates, using an image generation model, an output image based on the input image, where the output image is generated in a set of phases, and where each of the set of phases is based on a different mask band of a set of mask bands corresponding to the region of the input image based on the content preservation value. In some cases, the operations of this step refer to, or may be performed by, an image generation model as described with reference to FIG. 6.

FIG. 14 shows an example of a computing device 1400 for multi-modal image editing according to aspects of the present disclosure. In one aspect, computing device 1400 includes processor(s) 1405, memory subsystem 1410, communication interface 1415, I/O interface 1420, user interface component(s) 1425, and channel 1430.

In some embodiments, computing device 1400 is an example of, or includes aspects of, the image generation apparatus described with reference to FIGS. 1 and 6. In some embodiments, computing device 1400 includes one or more processors 1405 that can execute instructions stored in memory subsystem 1410 to obtain an input image, an inpainting mask, and a plurality of content preservation values corresponding to different regions of the inpainting mask; identify a plurality of mask bands of the inpainting mask based on the plurality of content preservation values; and generate, using an image generation model, an output image based on the input image and the inpainting mask, wherein the output image is generated in a plurality of phases, and wherein each of the plurality of phases uses a corresponding mask band of the plurality of mask bands as an input.

According to some aspects, computing device 1400 includes one or more processors 1405. Processor(s) 1405 are an example of, or includes aspects of, the processor unit as described with reference to FIG. 6. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1410 includes one or more memory devices. Memory subsystem 1410 is an example of, or includes aspects of, the memory unit as described with reference to FIG. 6. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some aspects, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1425 include a GUI.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, micro-controller, or state machine. A processor may also be implemented as a combination of computing devices (e.g., a combination of a DSP and a microprocessor, multiple micro-processors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:

obtaining an input image, an inpainting mask, and a plurality of different content preservation values respectively corresponding to different regions of the inpainting mask;

identifying a plurality of mask bands of the inpainting mask based on the plurality of different content preservation values, wherein each mask band of the plurality of mask bands comprises a different group of one or more pixels of the inpainting mask and is immediately adjacent to each other; and generating, using an image generation model, an output image based on the input image and the inpainting mask, wherein the output image is generated in a plurality of phases, and wherein each of the plurality of phases uses a different mask band of the plurality of mask bands as an input.

2. The method of claim 1, wherein:
the inpainting mask is obtained from a user selection via a user interface.

3. The method of claim 1, further comprising:
obtaining a mask softness value, wherein at least one of the plurality of different content preservation values is based on the mask softness value.

4. The method of claim 1, further comprising:
displaying the inpainting mask overlapping the input image, wherein the inpainting mask is displayed with a plurality of transparency values corresponding to the plurality of different content preservation values.

5. The method of claim 1, further comprising:
obtaining, via a user interface, a prompt describing content to be depicted in the output image, wherein the output image is generated based on the prompt.

6. The method of claim 5, wherein:
the prompt comprises a text prompt.

7. The method of claim 5, wherein:
the output image depicts, in an area corresponding to the inpainting mask, a blend of content from the input image and the content described by the prompt.

8. The method of claim 1, wherein:
the output image is generated using a reverse diffusion process; and
the plurality of phases correspond to a plurality of steps of the reverse diffusion process.

9. The method of claim 1, wherein:
the output image is generated using a generative adversarial network (GAN); and
the plurality of phases correspond to layers of the GAN.

10. A method for image generation, comprising:
obtaining an input image;
receiving, via a user interface, an area selection indicating a region of the input image;
receiving, via the user interface, a content preservation value; and
generating, using an image generation model, an output image based on the input image, wherein the output image is generated in a plurality of phases, and wherein each of the plurality of phases is based on a different mask band of a plurality of mask bands corresponding to the region of the input image based at least in part on the content preservation value.

11. The method of claim 10, further comprising:
receiving, via the user interface, a mask softness value, wherein the plurality of mask bands are identified based on the mask softness value.

12. A system for image generation, comprising:
one or more processors;
one or more memory components coupled with the one or more processors;
a mask component configured to identify a plurality of mask bands of an inpainting mask based on a plurality of different content preservation values respectively corresponding to different regions of the inpainting mask, wherein each mask band of the plurality of mask bands comprises a different group of one or more pixels of the inpainting mask and is immediate adjacent to each other; and
an image generation model comprising parameters stored in the one or more memory components and trained to generate an output image based on the plurality of mask bands.

13. The system of claim 12, wherein:
a user interface configured to obtain the inpainting mask based on an inpainting region indicated by a user.

14. The system of claim 12, wherein:
a user interface is further configured to obtain a global transparency value based on an alpha input from a user, wherein the plurality of different content preservation values is based on the global transparency value.

15. The system of claim 12, wherein:
a user interface configured to obtain a mask softness value based on a softness input from a user.

16. The system of claim 12, wherein:
the image generation model is further trained to generate the output image using a reverse diffusion process.

17. The system of claim 12, wherein:
the image generation model comprises a generative adversarial network (GAN) comprising a generator network configured to generate the output image.

18. The system of claim 12, wherein:
the image generation model is further configured to generate the output image based on a prompt.

19. The system of claim 18, wherein:
the image generation model comprises a text encoder configured to encode the prompt.

20. The system of claim 12, wherein:
the output image depicts, in an area corresponding to the inpainting mask, a blend of content from an input image and content described by a prompt.

* * * * *